US006216058B1

(12) United States Patent
Hosek et al.

(10) Patent No.: US 6,216,058 B1
(45) Date of Patent: Apr. 10, 2001

(54) SYSTEM OF TRAJECTORY PLANNING FOR ROBOTIC MANIPULATORS BASED ON PRE-DEFINED TIME-OPTIMUM TRAJECTORY SHAPES

(75) Inventors: Martin Hosek, Lowell; Hakan Elmali, Groton, both of MA (US)

(73) Assignee: Brooks Automation, Inc., Chelmsford, MA (US)

( * ) Notice: Subject to any disclaimer, the term of this patent is extended or adjusted under 35 U.S.C. 154(b) by 0 days.

(21) Appl. No.: 09/322,858

(22) Filed: May 28, 1999

(51) Int. Cl.[7] ...................................... G06F 19/00
(52) U.S. Cl. .................... 700/245; 700/250; 700/260; 700/261; 700/262; 414/217; 414/744.5; 414/744.6; 414/935; 414/936; 414/937; 318/568.21
(58) Field of Search ...................... 700/245, 250, 700/260, 262, 261; 414/217, 416, 744.5, 752.1, 754, 744.6, 730, 936, 937, 935; 318/560, 568.21

(56) References Cited

U.S. PATENT DOCUMENTS

| 4,218,172 | * | 8/1980 | Freund ................................ 414/730 |
| 5,647,724 | * | 7/1997 | Davis, Jr. et al. ................. 414/744.5 |
| 5,655,060 | * | 8/1997 | Lucas ..................................... 395/85 |

OTHER PUBLICATIONS

Chen et al., "Time–Optimal Control of Two–Degree of Freedom Robot Arms", IEEE., pp. 1210–1215, 1988.*
Bobrow et al., "Minimum–Time Trajectories for Two Robots Holding the Same Workpiece", IEEE. pp. 3102–3107, 1990.*
Ghalia et al., "A Robust Trajectory Tracking Control of Industrial Robot Manipulators Using Fuzzy Logic", IEEE., pp. 268–271, 1995.*
Roy et al., "Structural Design Optimization and Comparative Analysis of a New High–Performance Robot Arm Via Finite Element Analysis", IEEE., pp. 2190–2197, 1997.*
Zaognini et al., "Robust Control of Constrained Robot Arm", IEEE., pp. 91–96, 1993.*
Miksch et al., "Performance–Functional Based Controller Design for a Mobile Manipulator", IEEE., pp. 227–232, 1992.*

(List continued on next page.)

*Primary Examiner*—William A. Cuchlinski, Jr.
*Assistant Examiner*—McDieunel Marc
(74) *Attorney, Agent, or Firm*—Perman & Green, LLP

(57) ABSTRACT

A system for providing the reliable and numerically efficient generation of time-optimum trajectories with easy-to-track or continuous acceleration profiles for simple and blended moves of single- and multi-arm robotic manipulators, such as an extension and retraction move along a straight line or a rotary move following a circular arc, with velocity, acceleration, jerk, and jerk rate constraints. A time-optimum trajectory is the set of the position, velocity, and acceleration profiles which describe the move of a selected end effector along a given path in the shortest time possible without violating given constraints, with a special case being an optimum abort trajectory, which brings the moving arm into complete rest in the shortest time. The invention involves firstly identifying the set of fundamental trajectory shapes which cover all possible combinations of constraints for a given category of moves, e.g., a move along a straight line or along a circular arc; next, decomposing the fundamental shapes into segments where a single constraint is active; and, then, determining the time optimum paths in the segments. As a result, a unique design of time-optimum trajectories is produced based on a set of pre-defined trajectory shapes. The invention also involves the blending of simple moves into a single trajectory by decomposing trajectories of the individual moves into their orthogonal components and overlapping them for a given time interval, which results in a non-stop move along a smooth transfer path.

24 Claims, 26 Drawing Sheets

OTHER PUBLICATIONS

Rsheim, "Design of an Omniderectional Aram", IEEE., pp. 2162–2167, 1990.*

Hamerlain et al., "Robust Control Applied to Robit Arm", IEEE., pp. 1141–1146, 1997.*

Asari et al., "Development of a Model–Based Remote Maintenance Robot System (IV)", IEEE., pp. 1245–1251, 1993.*

* cited by examiner

# SYSTEM OF TRAJECTORY PLANNING FOR ROBOTIC MANIPULATORS BASED ON PRE-DEFINED TIME-OPTIMUM TRAJECTORY SHAPES

BACKGROUND OF THE INVENTION

1. Field of the Invention

The present invention relates to robotic manipulators and, more particularly, to a method and means for the reliable and numerically efficient generation of constrained time-optimum trajectories for the simple and compound or blended moves of single-arm, dual-arm, and multi-arm robotic manipulators.

2. Prior Art

Single-arm, dual-arm, and multi-arm, i.e., single end effector, dual end effector, and multi end effector, robotic manipulators are used in various types of transport apparatus in embodiments well known in the prior art. Examples of typical transport apparatus including such embodiments are described in U.S. Pat. Nos. 4,730,976, 5,180,276, 5,404,894, 5,431,529, 5,647,724, 5,655,060, 5,765,983, and in pending U.S. application Ser. No. 09/163,844, the latter having an assignee in common with this application, and the disclosures of all of which are incorporated herein by reference. In an embodiment such as used with a substrate transport apparatus, the transport arms have the end effectors mounted thereon for carrying substrates, such as semiconductor wafers or flat panel displays, through suitable trajectories for processing. The substrate is typically held by means of frictional force between the substrate and the end effector, which force may be supplemented or accompanied by a vacuum or electrostatic holddown in some applications. Therefore, the substrate will slide if the inertial force at the substrate exceeds the holding force securing it to the end effector, so that the transfer time is limited by the magnitude of this holding force. Furthermore, additional constraints, such as limited velocity and jerk, are typically required for safe operation and trajectory tracking reasons. Accordingly, a computationally efficient system that calculates a transfer trajectory without causing the substrate to slide and without violating prescribed constraints is required for maximum substrate throughput levels. In an existing approach, e.g., refer to U.S. Pat. No. 5,655,060, a backward trajectory (backward from the end position of the move) and a forward trajectory (forward from the start position of the move) are calculated iteratively and blended. However, the present state of the available methods, in this exemplary approach and other embodiments, for achieving iterative trajectory generation with the known multi-arm robotic manipulators is fraught with problems. For example, generally among these methods the existence of a reliable solution to the iterative computation is not guaranteed and the calculations are computationally demanding and time consuming, leading to delays, especially in the abort function. Suboptimal acceleration profiles and defective trajectory profiles cause acceleration tracking difficulties and throughput loss. Trajectories change drastically for small variations in departure and destination positions. A large memory is required to store trajectory points, and different settings are required for different arms/speeds.

A number of typical defects that occur with existing trajectory generation in substrate transport apparatus are illustrated in the acceleration vs. time profiles in FIGS. 1–10, with the defects being indicated by circles. Specifically, FIGS. 1–6 variously show radial extension of the arms and FIGS. 7–10 show rotational movement. It will be seen that the smoothness of the acceleration profiles is interrupted at the portions of the curves indicated by the circles.

Another drawback of the existing approach, typified by that in U.S. Pat. No. 5,655,060, is that individual moves must be executed sequentially with no provision for blending simple moves into a single trajectory to create a single smooth transfer path. The sequential execution requires stops between the individual moves and increases the overall travel time.

Problem to be Solved

Thus, there is a need in the art for an approach that will achieve trajectory generation in multi-arm robotic manipulators with reliable and numerically efficient calculation of time-optimum trajectories having easy-to-track or continuous acceleration profiles for controlling the movement of the multi-arms of the manipulators. There is also a need for an approach that generates trajectories for simple moves that can be blended to create a smooth non-stop transfer path, and a method to achieve this blending.

Objects

It is accordingly an object of the present invention to provide a method and means for the reliable and numerically efficient generation of time-optimum trajectories with easy-to-track or continuous acceleration profiles for controlling the simple movement of multi-arm robotic manipulators, such as an extension and retraction move along a straight line, or a rotary move following a circular arc, with velocity, acceleration, and jerk constraints.

It is another object of the invention to provide a system for the reliable and numerically efficient generation of time-optimum trajectories with smooth acceleration profiles for controlling the movement of multi-arm robotic manipulators in a substrate transport apparatus, such as, but not limited to, an extension and retraction move along a straight line, or a rotary move following a circular arc, with velocity, acceleration, and jerk constraints on the arm-mounted end effector carrying a substrate.

It is a further object of the invention to provide a system for the reliable and numerically efficient generation of time-optimum trajectories for simple and blended moves of multi-arm robotic manipulators, such as, but not limited to, an extension and retraction along a straight line or a rotary move following a circular arc, with velocity, acceleration, and jerk constraints.

It is also an object of the invention to provide a system and method for generating trajectories for simple moves of multi-arm robotic manipulators, which moves can be blended to create a smooth non-stop transfer path.

SUMMARY OF THE INVENTION

The present invention is directed to providing a method and means for the reliable and numerically efficient generation of time-optimum trajectories with easy-to-track or continuous acceleration profiles for simple and blended moves of multi-arm robotic manipulators, such as, but not limited to, an extension and retraction move along a straight line or a rotary move following a circular arc, with velocity, acceleration, jerk, and in some cases jerk rate, constraints. A time-optimum trajectory is understood to be the set of the position, velocity, and acceleration profiles which describe the move of a selected end effector along a given path in the shortest time possible without violating given constraints, with a special case being an optimum abort trajectory, which brings the moving arm into complete rest in the shortest time. More particularly, the invention involves firstly identifying the set of fundamental trajectory shapes which cover all possible combinations of constraints for a given category of moves, e.g., a move along a straight line or along a circular arc; next, decomposing the fundamental shapes into segments where a single constraint is active; and, then, determining the time optimum paths in the segments. As a result, a unique design of time-optimum trajectories is produced based on a set of pre-defined trajectory shapes.

The invention also involves the blending of simple moves into a single trajectory by decomposing trajectories of the individual moves into their orthogonal components and overlapping them for a given time interval, which results in a non-stop move along a smooth transfer path.

BRIEF DESCRIPTION OF THE DRAWINGS

The features of the present invention are set forth in the following description, taken in connection with the accompanying drawings, wherein:

FIGS. 1–4 variously show radial extension of the arms with acceleration constraint active (at least one end effector loaded);

FIGS. 5 and 6 show radial extension with acceleration constraint inactive (end effectors unloaded);

FIGS. 7–9 show rotational movement with acceleration constraint active (at least one end effector loaded); and FIG. 10 shows rotational movement with acceleration constraint inactive (end effectors unloaded).

FIG. 11 illustrates the generic trajectory shape for moves along a straight line; and FIGS. 12–19 contain shapes derived from the generic shape of FIG. 11 and illustrate fundamental trajectory shapes for movement along a straight line with the numbers indicating so-called trajectory nodes, i.e, the points that divide the trajectories into segments.

FIG. 35 illustrates the generic trajectory shape;

FIGS. 36–47 contain fundamental trajectory shapes derived from the generic shape of FIG. 35 with the numbers indicating so-called trajectory nodes; and FIGS. 48 and 49 show the corresponding shapes for abort trajectories.

FIG. 53 shows the case for a single arm robot with radial extension and acceleration constraint active (end effector loaded);

FIG. 54 shows the case for a dual-arm frog-leg robot with radial extension and acceleration constraint on one end effector A active (loaded) and acceleration constraint on the other end effector B inactive (unloaded);

FIG. 55 shows the case for a dual-arm frog-leg robot with radial extension and acceleration constraint on end effector A inactive (unloaded) and acceleration constraint on end effector B active (loaded);

FIG. 56 shows the case for a dual-arm frog-leg robot with radial extension and acceleration constraints on end effectors A and B inactive (unloaded);

FIG. 57 shows the case for rotational move with acceleration constraint active (at least one end effector loaded); and FIG. 58 shows the case for rotational move with acceleration constraint inactive (end effectors unloaded).

DETAILED DESCRIPTION OF THE PREFERRED EMBODIMENTS

Figure 1:
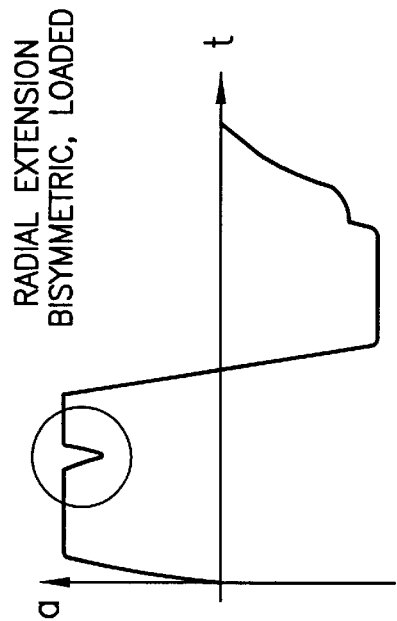
FIGS. 1–10 show prior art acceleration profiles, acceleration vs. time plots, illustrating typical defects within the circles that occur with existing trajectory generation in substrate transport apparatus. More particularly.
Figure 2:
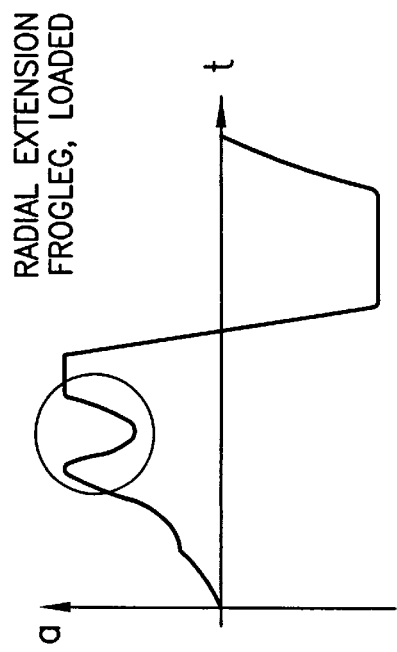
Figure 3:
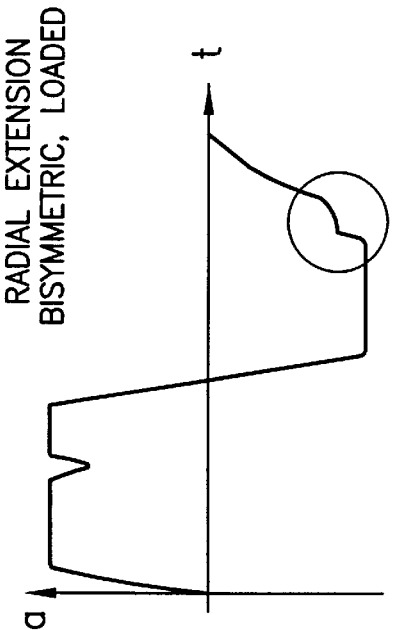
Figure 4:
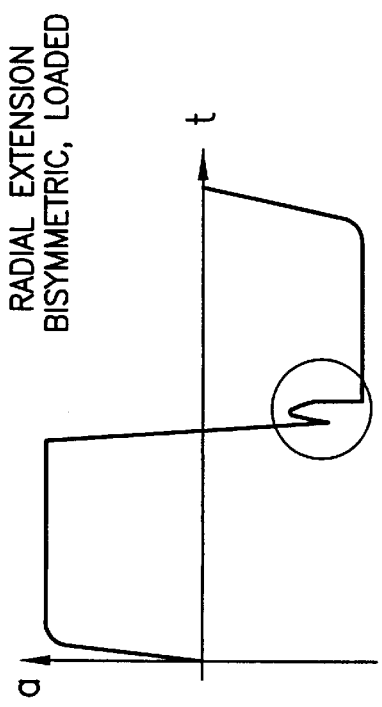
Figure 5:
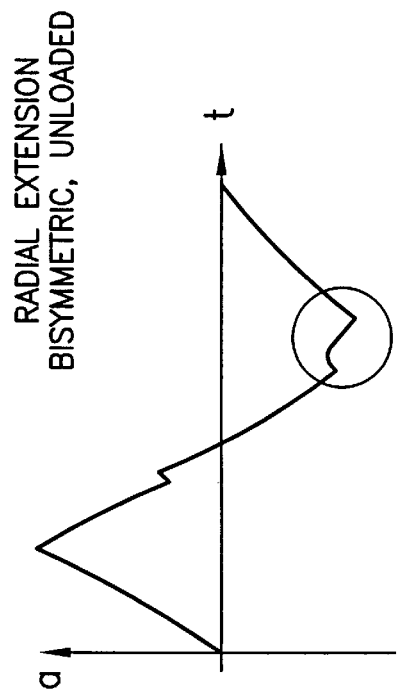
Figure 6:
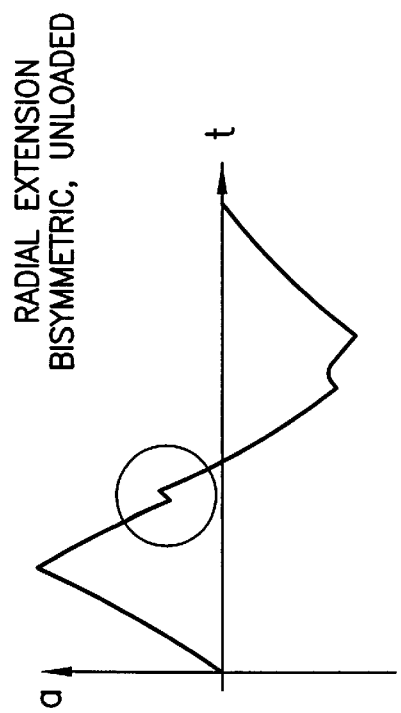
Figure 7:
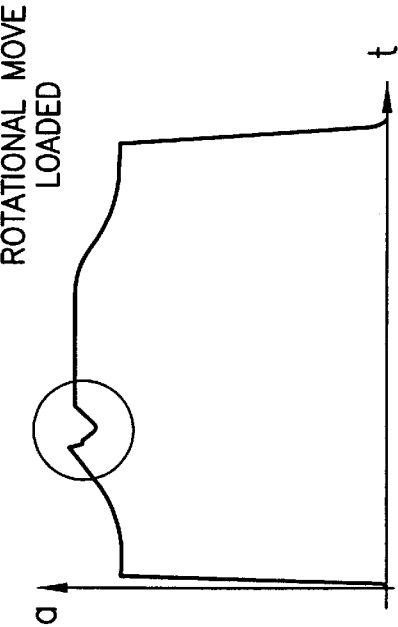
Figure 8:
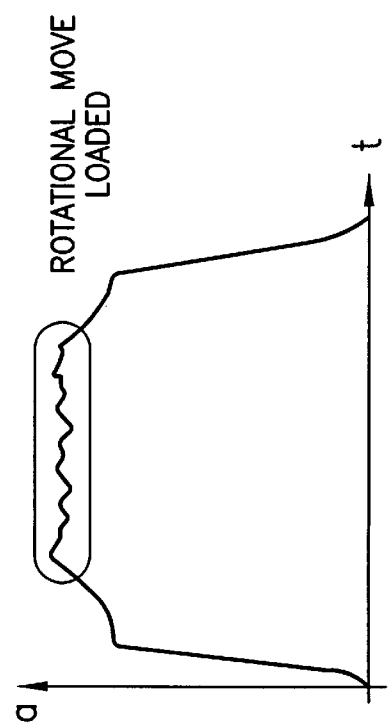
Figure 10:
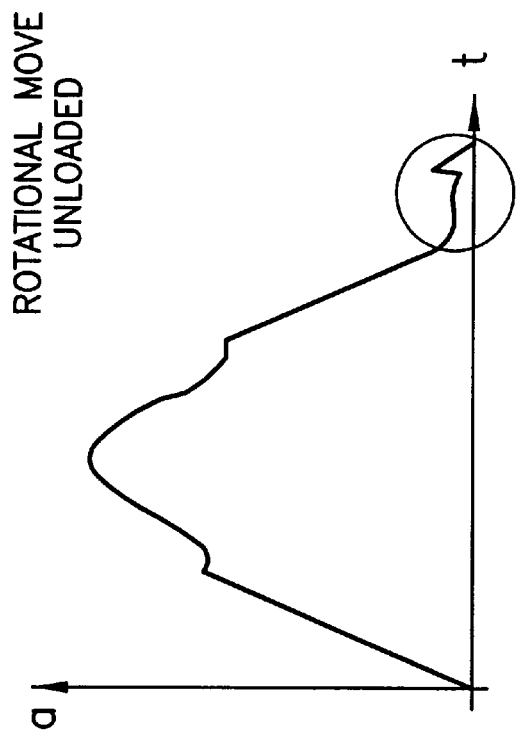
Figure 9:
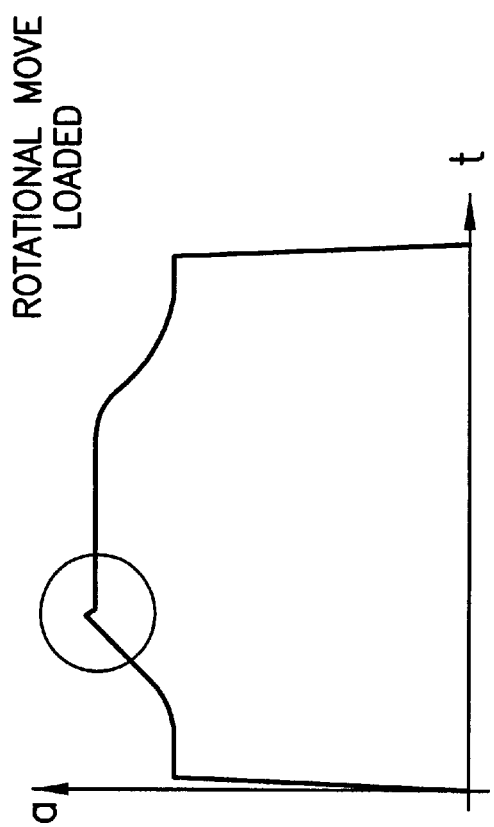

The present invention involves a method and means for controlling the moves of multi-arm robotic manipulators in transport apparatus to produce reliable and numerically efficient generation of time-optimum trajectories with easy-to-track or continuous acceleration profiles during transport arm movement with simple and blended moves. A time-optimum trajectory is understood to be the set of the position, velocity, and acceleration profiles which describe the move of a selected arm along a given path in the shortest time possible without violating given constraints, with a special case being an optimum abort trajectory, which brings the moving arm into complete rest in the shortest time. The invention is directed to overcoming the interruptions that occur, due to the typical defects in existing trajectory generation in substrate and other transport apparatus, such as are illustrated in the prior art acceleration profiles of FIGS. 1–10 by the portions of the curves surrounded by circles, as well as other disadvantages of the existing approach, i.e., typified by U.S. Pat. No. 5,655,060. The invention may be used to smooth arm movements such as extension and retraction moves along a straight line, or a rotary move following a circular arc, with velocity, acceleration, and jerk constraints. In contrast to the existing approach, wherein a backward trajectory (backward from the end position of the move) and a forward trajectory (forward from the start position of the move) are calculated iteratively and blended, the smoothing or reliable and numerically efficient generation of time-optimum trajectories for simple and blended moves, is achieved by the steps of: identifying the set of fundamental trajectory shapes which cover all possible combinations of constraints for a given category of moves, e.g., the move along a straight line or along a circular arc; decomposing the fundamental shapes into segments where a single constraint is active; and, determining the time optimum paths in the segments. The desired trajectory is then generated by assembling the appropriate segments into the path of the trajectory. Thus, the invention produces a unique design of time-optimum trajectories based on a set of pre-defined trajectory shapes and can be used to provide a method of calculating trajectories for compound moves via blending.

More particularly, a reliable and numerically efficient blending of trajectories for simple moves of multi-arm robotic manipulators into a non-stop compound move along a smooth path, is achieved with the present invention by: decomposing trajectories for the individual simple moves into independent, e.g., orthogonal, components, overlapping the independent components of the trajectories for the individual simple moves for a given time interval, and combining the overlapped components into a trajectory that provides a non-stop move along a smooth path.

Implementation of the invention is graphically illustrated in FIGS. 11–58. For purposes of the following description, as suggested above, "single-arm robot" denotes a robotic manipulator equipped with a single end effector, a "dual-arm robot" denotes a robotic manipulator equipped with two end effectors, and the general "multi-arm robot" denotes a robotic manipulator equipped with multiple end effectors. Both single-arm and dual-arm robot arrangements may be of the well-known two-link type or of a frog-leg design, such as disclosed respectively in U.S. Pat. Nos. 5,765,983 and 4,730,976, incorporated herein by reference. Also mentioned are the "BiSymmetrik" and "Leapfrog" arm designs, disclosed in U.S. Pat. Nos. 5,180,276 and 5,647,724, incorporated herein by reference, and which names are trademarks of Brooks Automation, Inc., the assignee of the present application.

Figure 49:
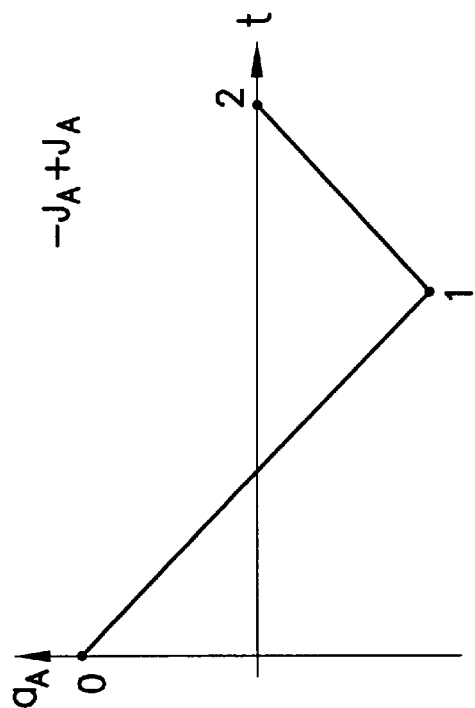
Figure 50B:
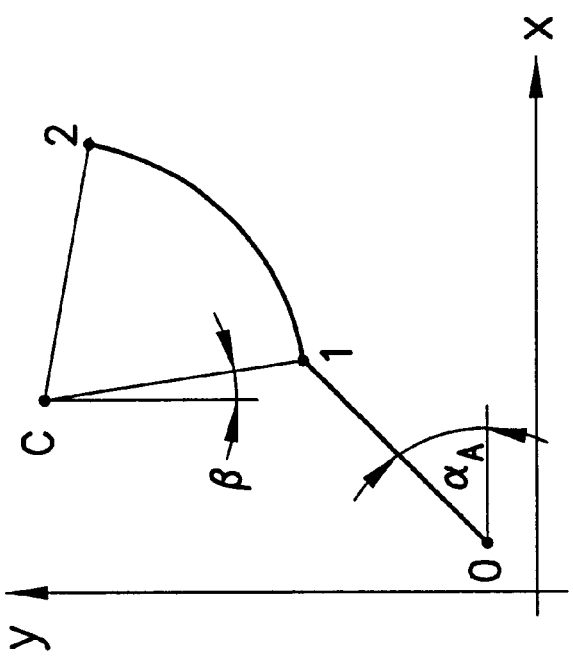
FIG. 50 illustrates trajectory blending by schematically depicting, on the left side (a), the path for an exemplary sequential move consisting of two straight-line segments, from point 0 to 1 and from point 1 to 2 on the path, and on the right side (b), an exemplary sequential move along a straight line and along a circular arc, from point 0 to 1 and 1 to 2, respectively.
Figure 50A:
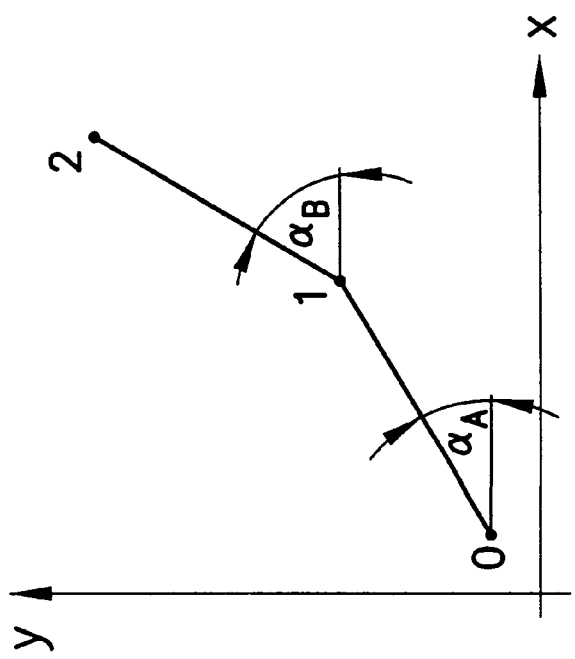
Figure 51B:
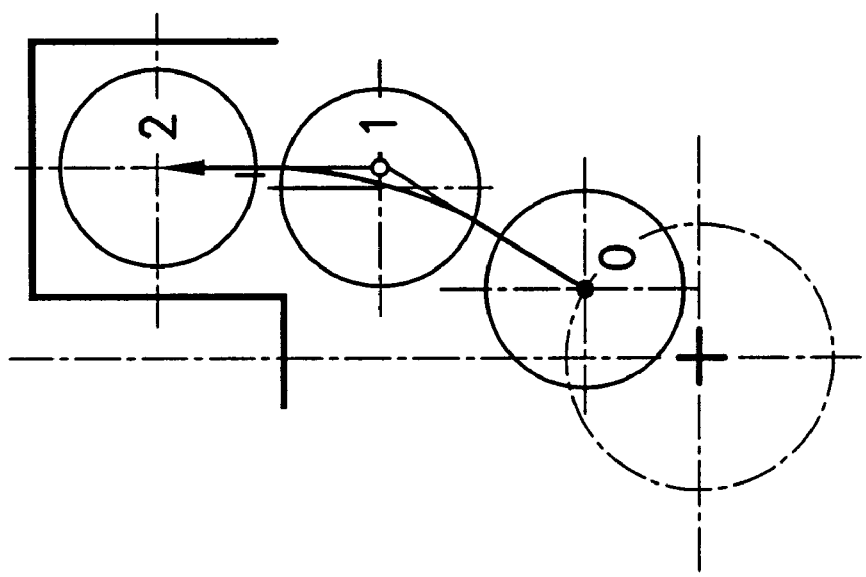
FIG. 51 illustrates other examples of the trajectory blending of two straight-line moves showing round substrates following two straight-line segments, from point 0 to 1 and from point 1 to 2, on the left side (a) for the sequential case, and, on the right side (b) for a compound move, wherein the center of the substrate does not actually move through point 1 but rather follows the smooth path indicated.
Figure 51A:
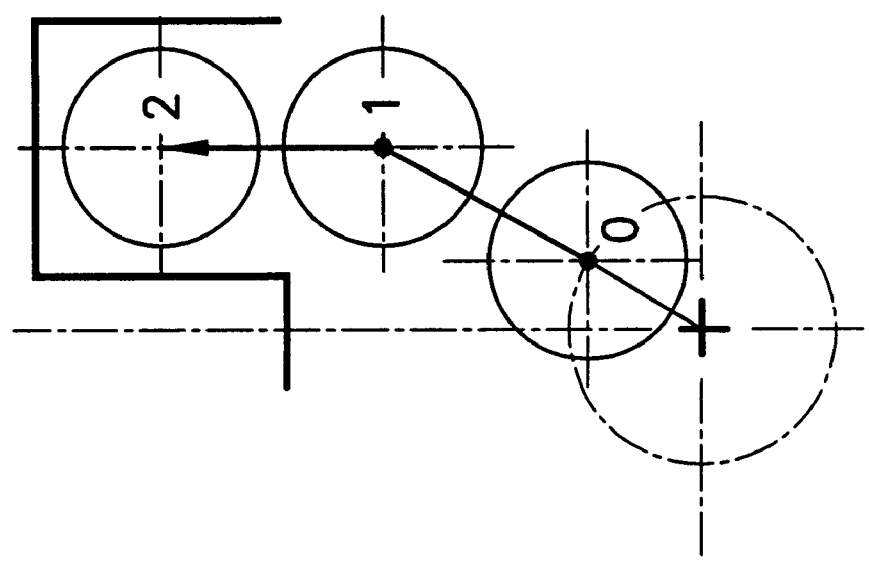
Figure 52B:
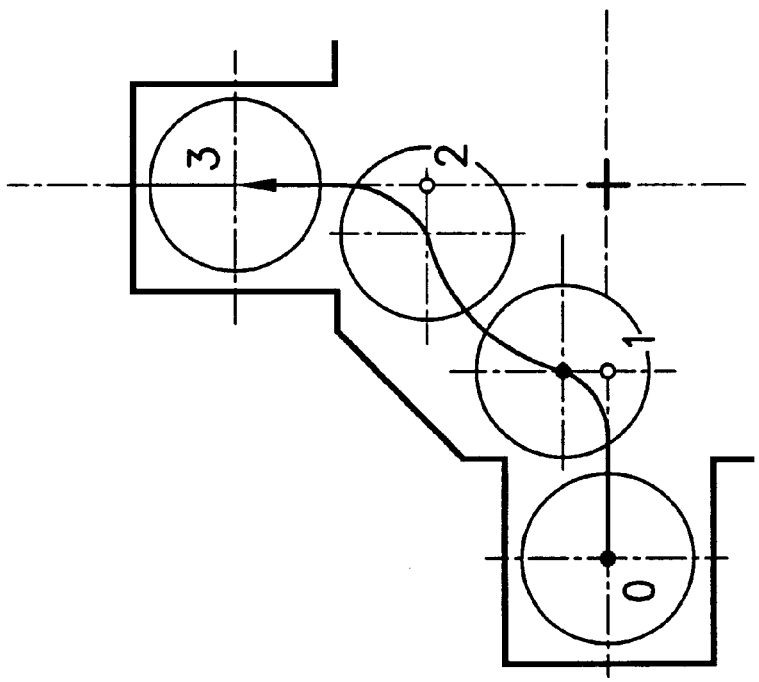
FIG. 52 illustrates examples of the trajectory blending of two moves along a straight line, i.e., segments from point 0 to 1 and from point 2 to 3, and a move along a circular arc, the segment from point 1 to 2, showing round substrates following the respective segments, on the left side (a) for the sequential case, and, on the right side (b) for a compound move, and wherein the left side (a) case represents the path according to the prior art and the right side (b) represents an optimum transfer path for round substrates undergoing compound moves in accordance with the invention.
Figure 52A:
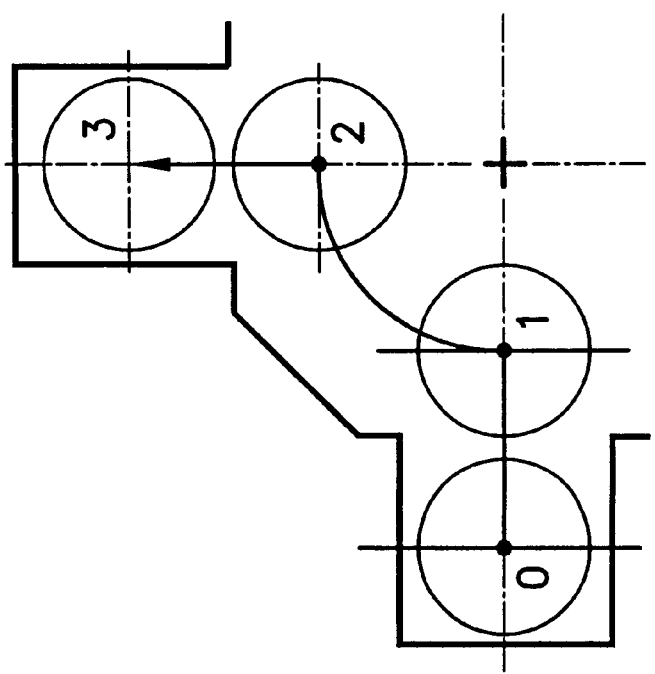
Figure 53:
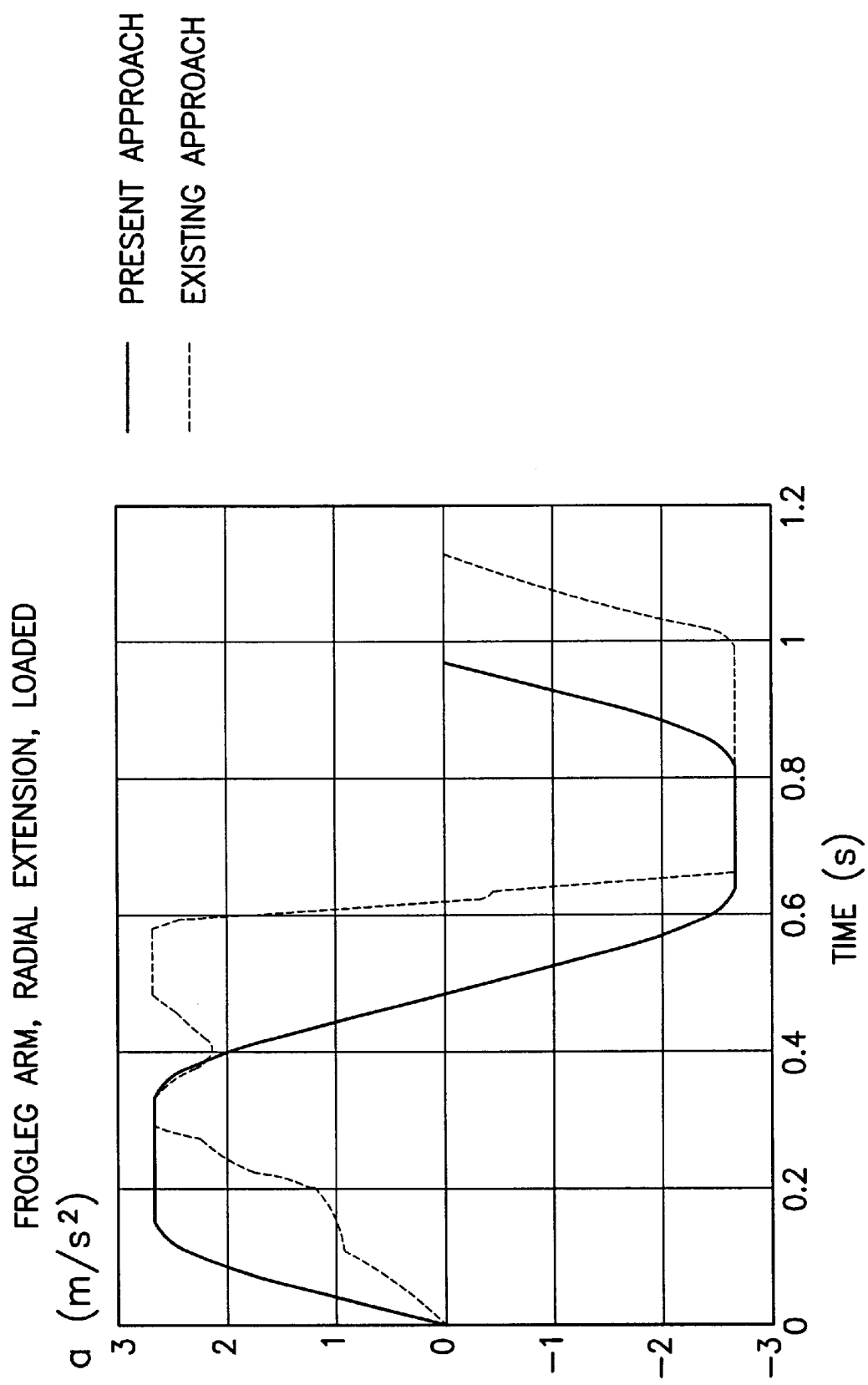
FIGS. 53–58 show acceleration profiles, acceleration vs. time plots, illustrating further comparisons of the acceleration profiles in accordance with the invention and those obtained with the iterative approach of the prior art. More particularly.
Figure 54:
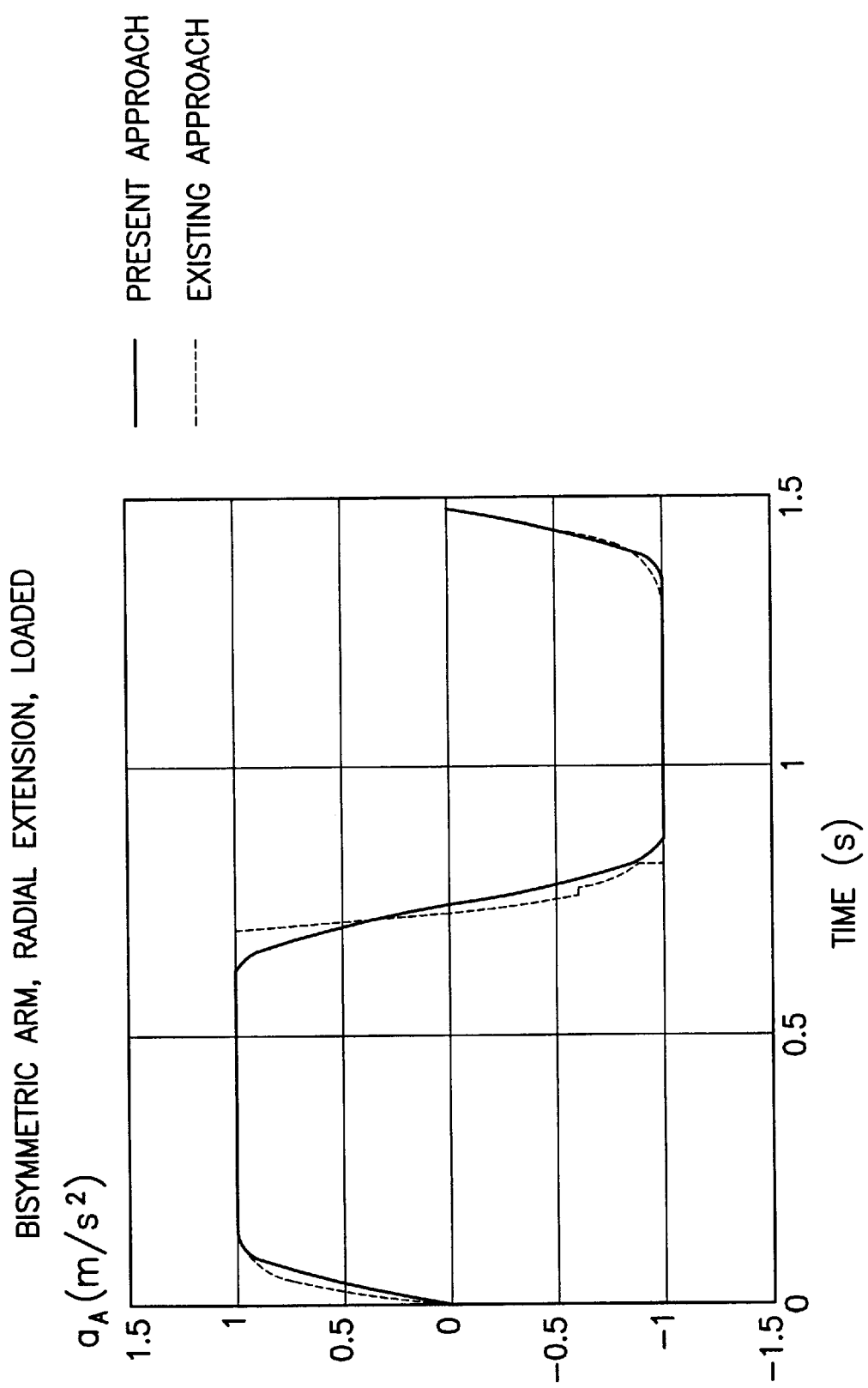
Figure 55:
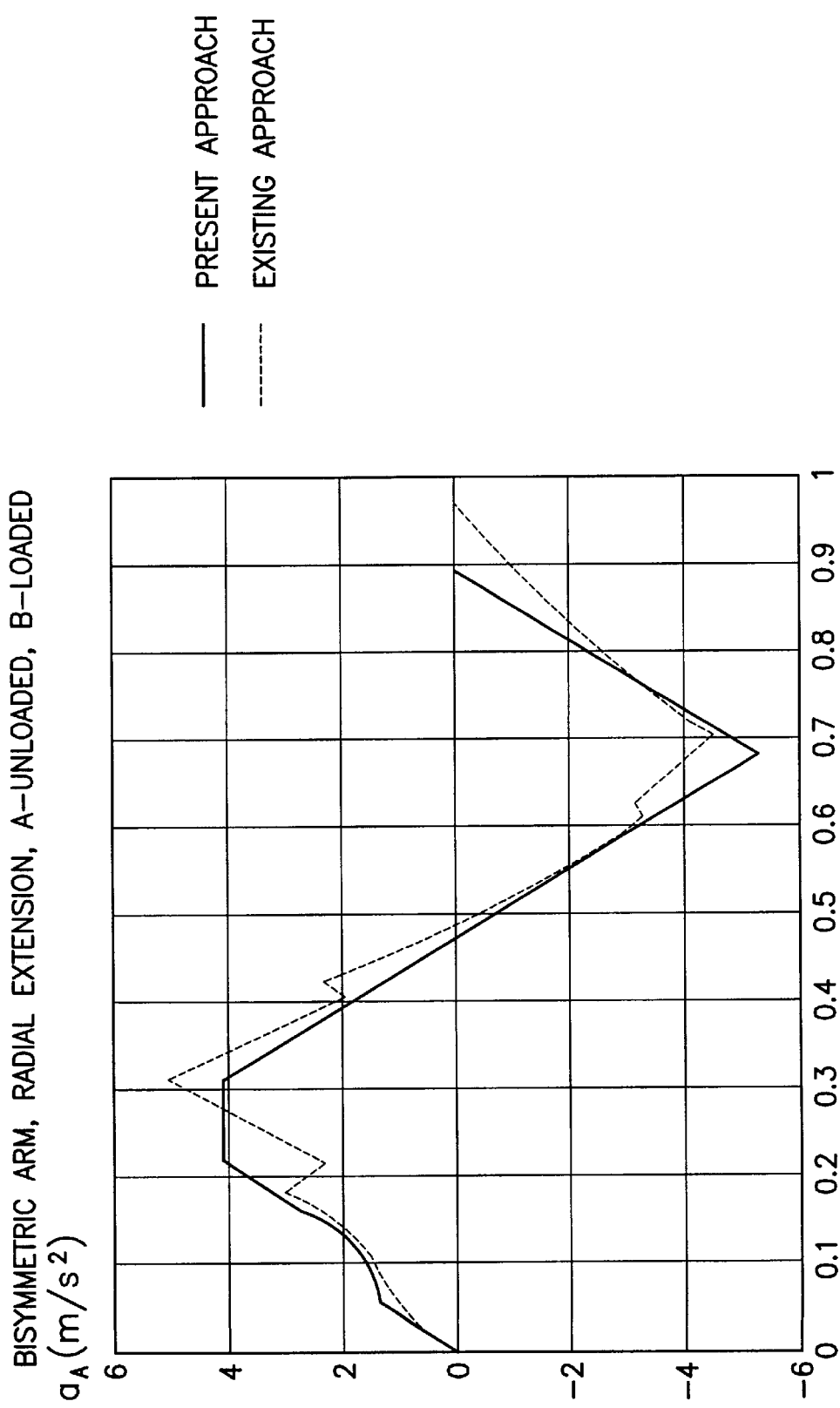
Figure 56:
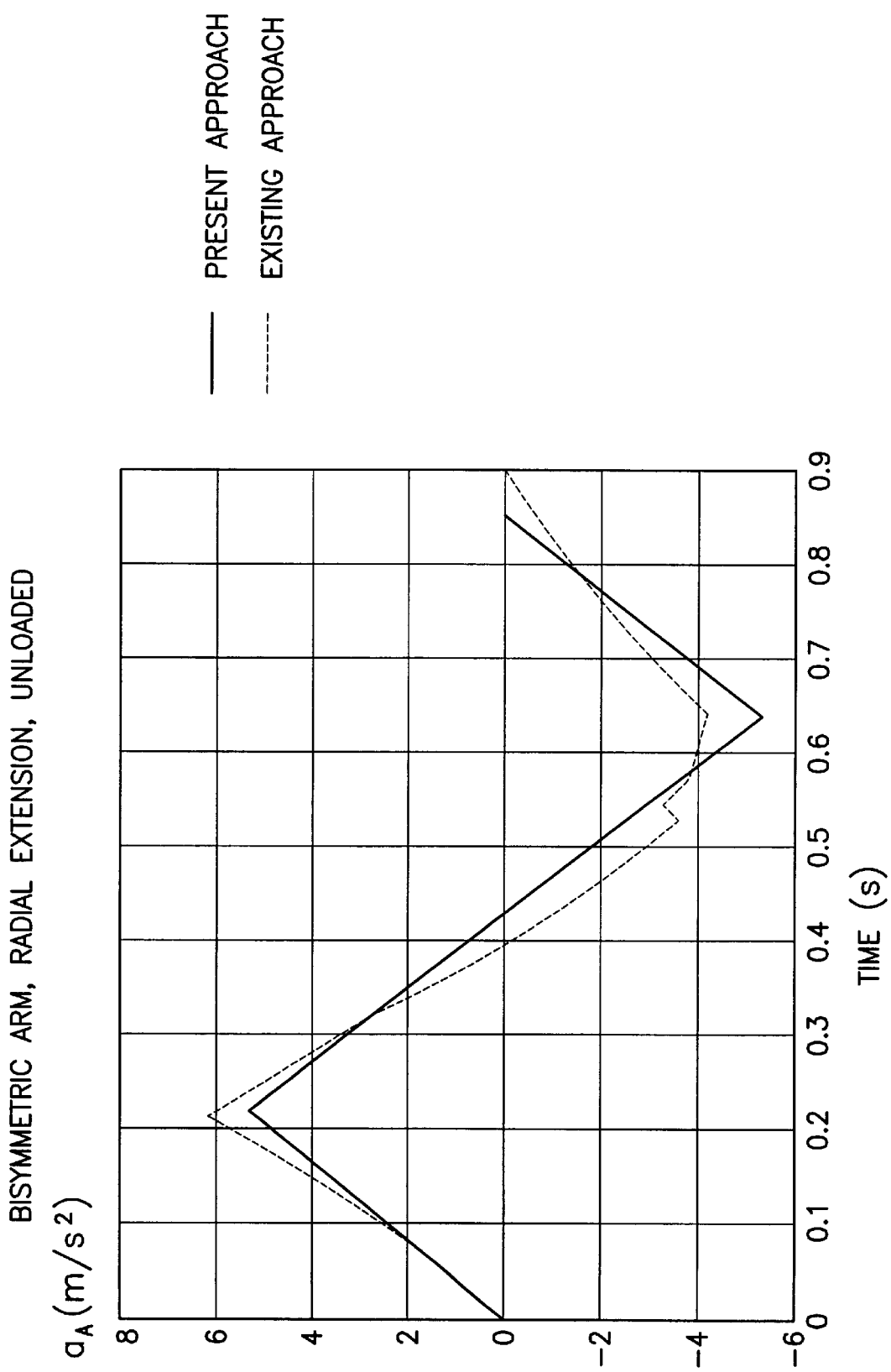
Figure 57:
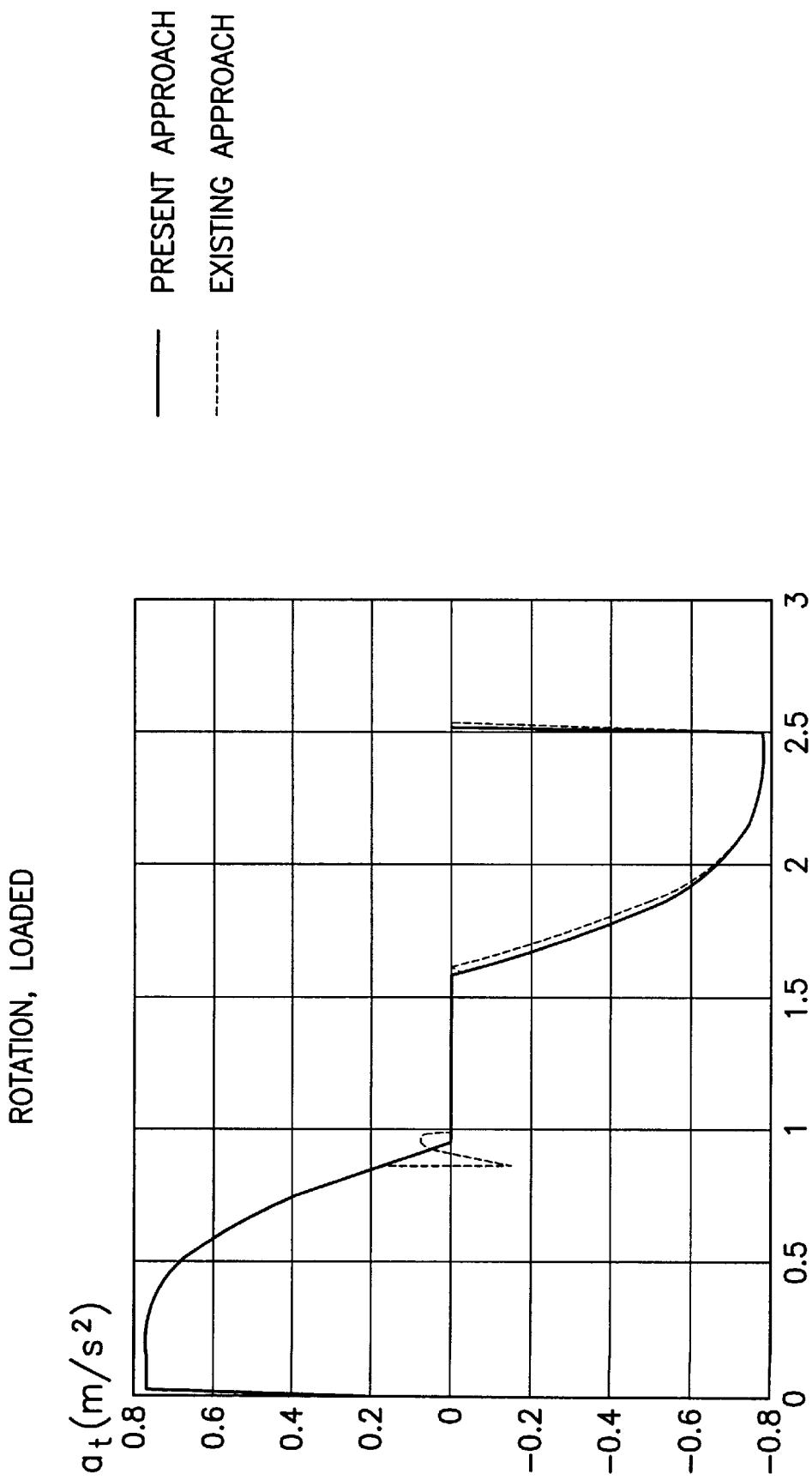
Figure 58:
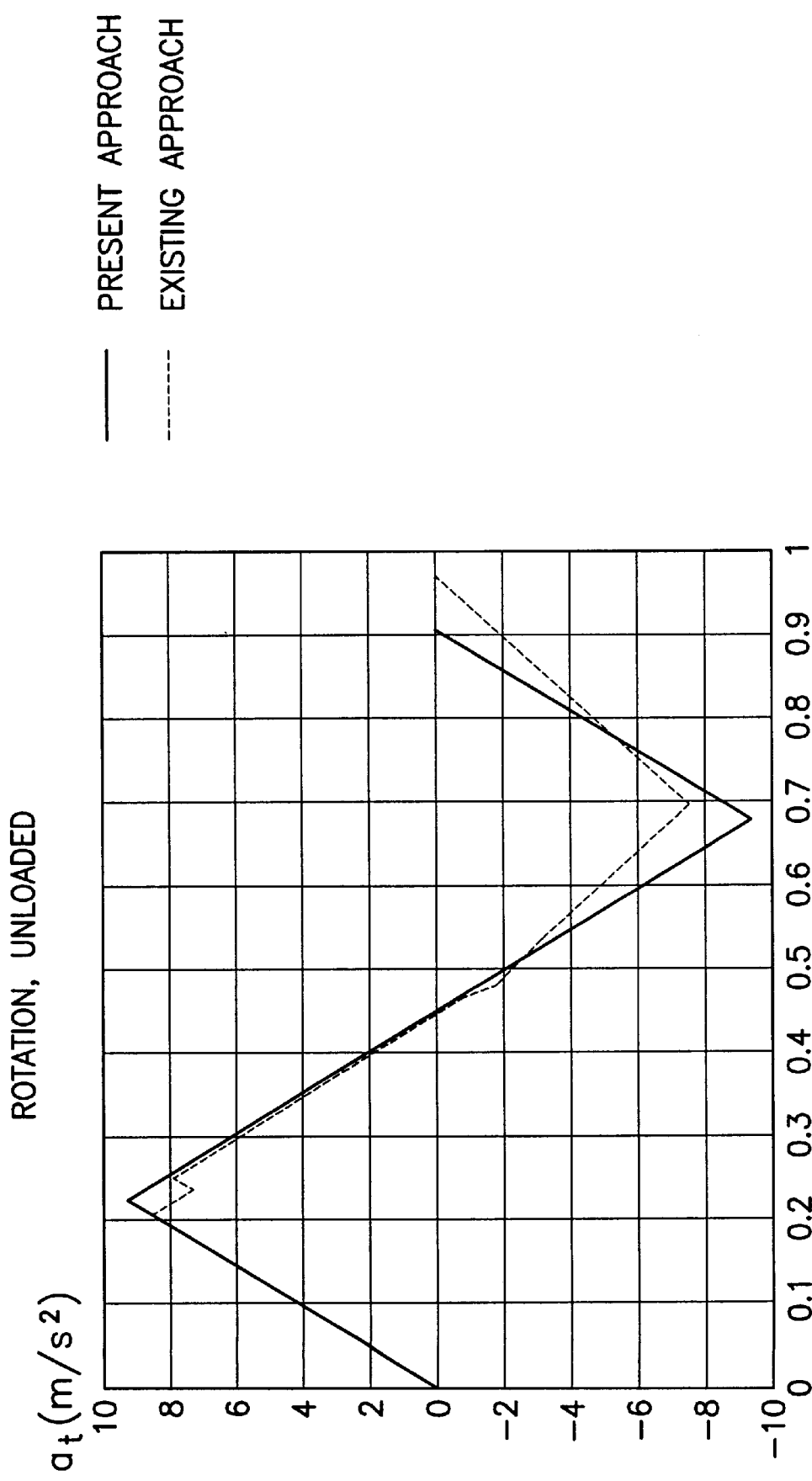

In general, different sets of constraints are considered for each end effector of the robot. Typically, a set of constraints may include the maximum allowable velocity, acceleration, jerk, and jerk rate, which are imposed on the center point of the end effector. Examples of basic categories of moves are presented: a move along a straight line for a single-arm robot (FIGS. 11–25), a move along a circular arc for a single-arm robot (FIGS. 26–34), a radial move for a dual-arm frog-leg robot with certain constraints (FIGS. 11–25) and with other constraints (FIGS. 35–49), and a rotational move for a dual-arm robot (FIGS. 26–34), where the trajectory is generated for one of the arms (end effectors) of the dual-arm robot. Further, in addition to the foregoing simple moves, the blending of simple moves into a single trajectory is also described (FIGS. 50–52).

The fundamental shapes for each of the four categories are found as simplified versions of the generic shape which corresponds to the case when all of the constraints are active. Each of the shapes have a set of conditions associated with it which determine whether the shape can be used for the particular move. For example, sets of conditions associated with selected shapes are as follows:

Example 1: The conditions that must be satisfied for the shape in FIG. 12, i.e., the most complex shape for a straight-line move, are:

($t_1 > t_0$) and ($t_3 > t_2$) and ($t_6 > t_5$), i.e., segments 0-1, 2-3, and 5-6 exist.

Example 2: The conditions that must be satisfied for the shape in FIG. 19, i.e., the simplest shape for a straight-line move, are:

max $|j| \leq j_{max}$ and max $|a| \leq a_{max}$ and $t \in (t_0, t_2)$ $t \in (t_0, t_2)$ max $|v| \leq v_{max}$ $t \in (t_0, t_2)$.

Trajectories generated by the method of the invention are completely defined by a set of nodal points which typically may include time, position, velocity, acceleration, jerk, and jerk rate. The corresponding position, velocity, and acceleration profiles are constructed from the nodal points using the set of equations associated with the selected trajectory shape.

The generic trajectory shapes for the basic categories of moves, their mathematical description, and the depiction of the associated fundamental shapes will now be described.

Single-arm Robot Move Along a Stright Line

To begin with, a move of a single-arm robot along a straight line in accordance with the invention is considered, which move is constrained by maximum velocity, acceleration, jerk and jerk rate imposed on the center point of the end effector. Exemplary time-optimum trajectory shapes are shown in FIGS. 11–19, wherein the segment identifiers refer to the following parameters:

a=acceleration (m/s$^2$)
$a_i$=acceleration at node i (m/s$^2$)
$a_{max}$=maximum acceleration (m/s$^2$)
d=rate of change of jerk (m/s$^4$)
$d_i$=rate of change of jerk at node i (m/s$^4$)
$d_{max}$=maximum rate of change at jerk (m/s$^4$)
j=jerk (m/s$^3$)
$j_i$=jerk at node i (m/s$^3$)
$j_{max}$=maximum jerk (m/s$^3$)
s=position (m)
$s_i$=position at node i (m)
$s_{max}$=travel distance (m)
t=time (s)
$t_i$=time at node i (s)
v=velocity (m/s)
$v_i$=velocity at node i (m/s)
$v_{max}$=maximum velocity (m/s) .

Figure 11:
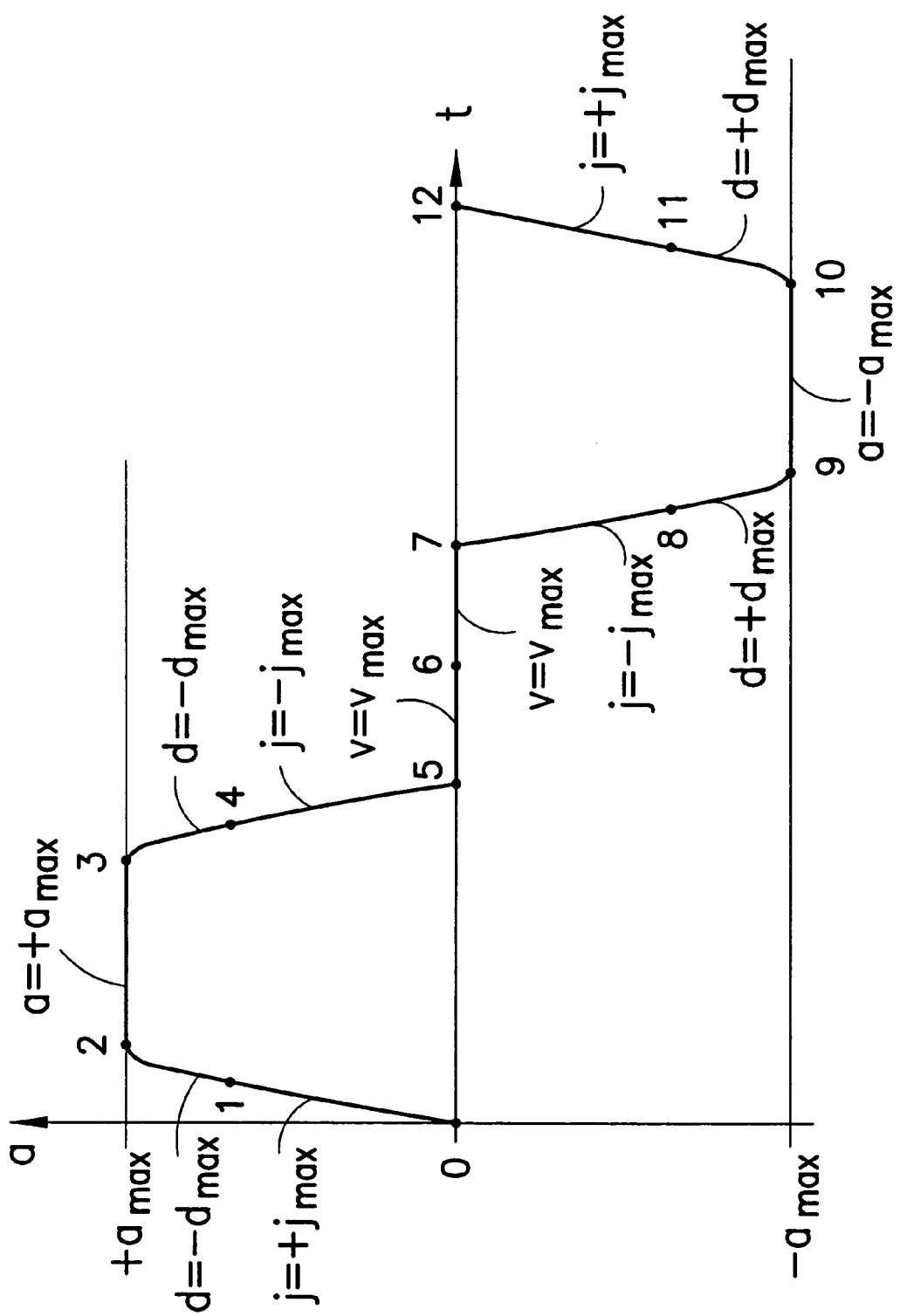
FIGS. 11–19 show acceleration profiles illustrating exemplary time-optimum trajectory shapes for moves of a single-arm robot, and in some cases a multi-arm robot, along a straight line in accordance with the invention. More particularly.
Figure 13:
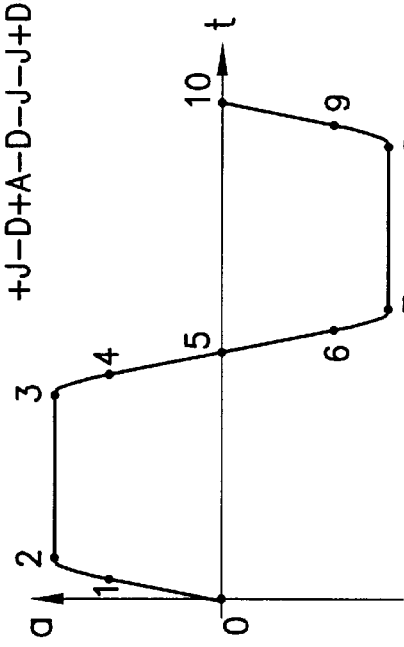
Figure 15:
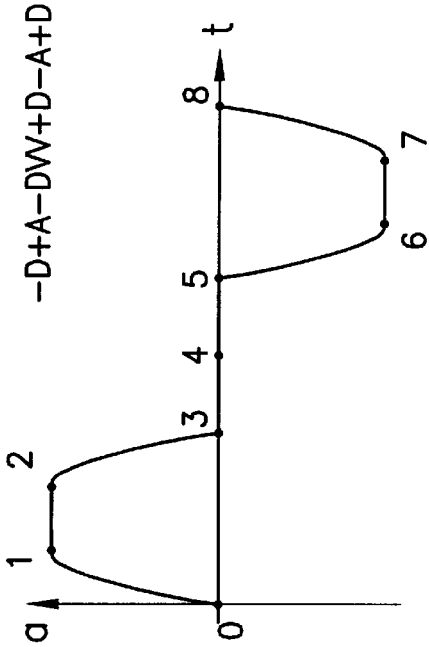
Figure 12:
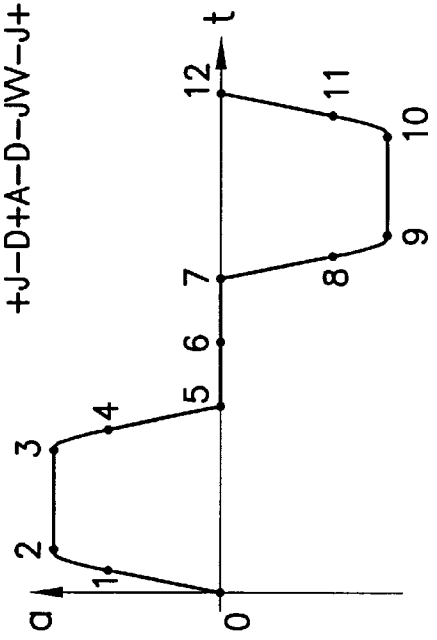
Figure 14:
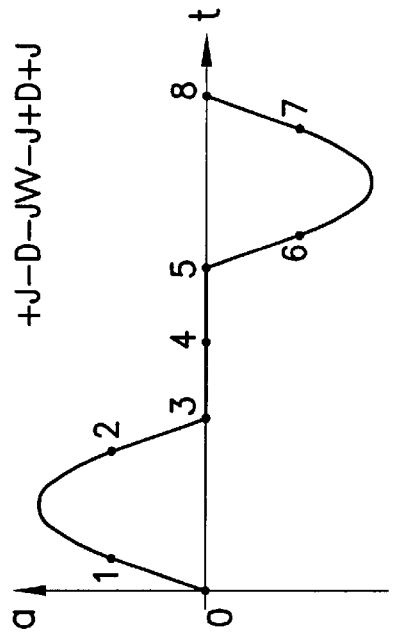
Figure 16:
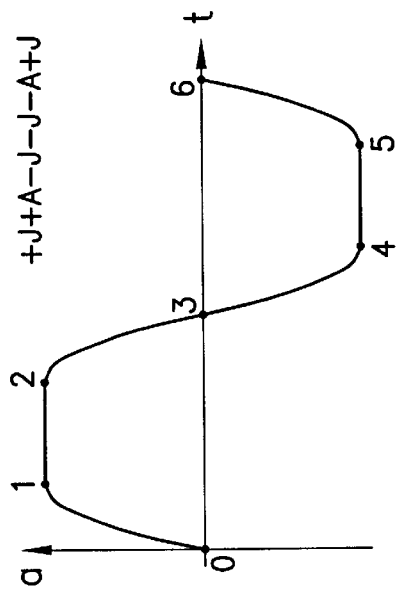
Figure 17:
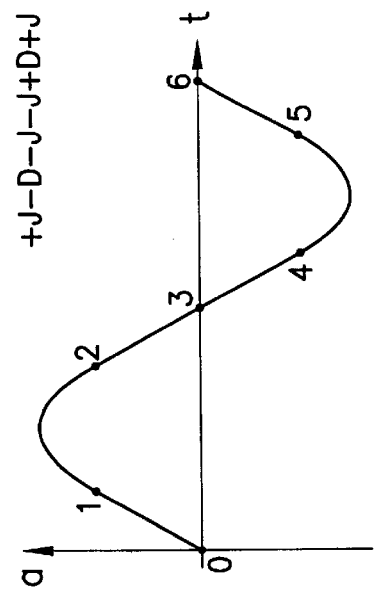
Figure 18:
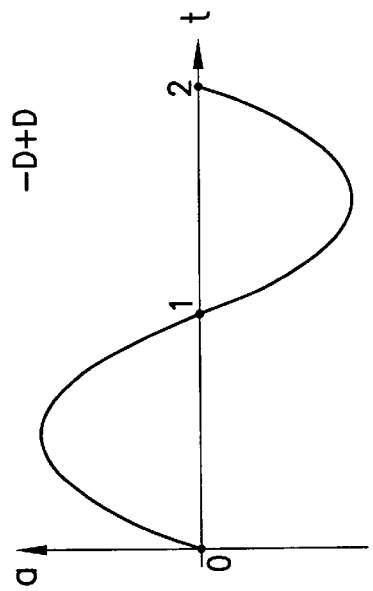
Figure 19:
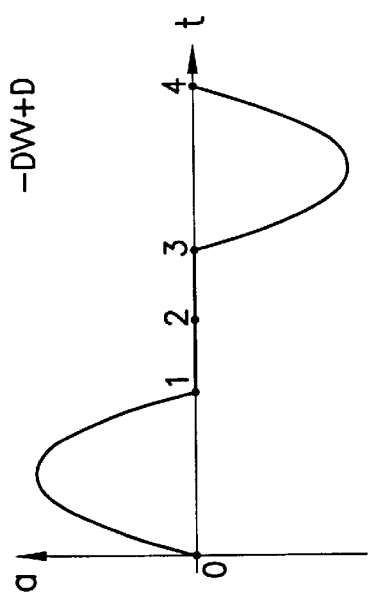
Figure 20:
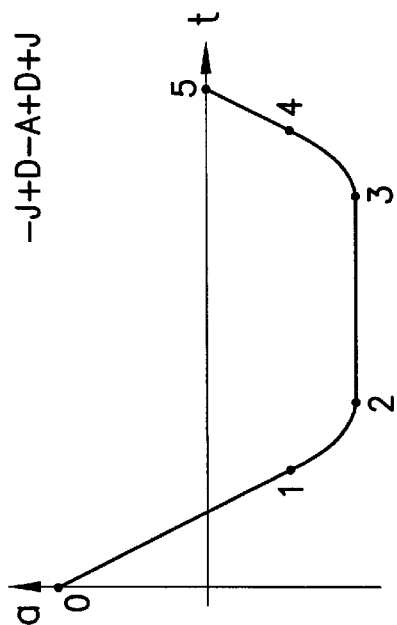
FIGS. 20–25 summarize corresponding trajectory shapes to those of FIGS. 12–19 for abort trajectories.
Figure 21:
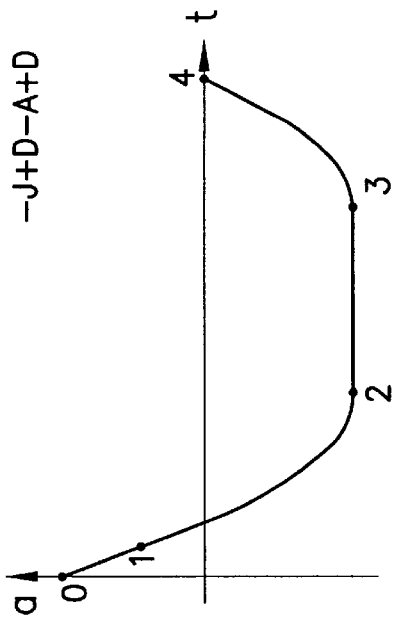
Figure 22:
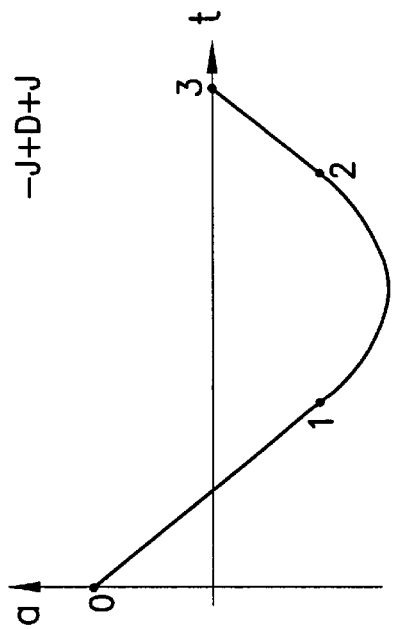
Figure 23:
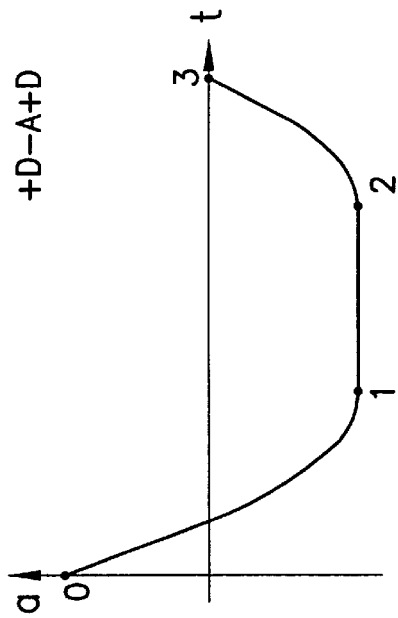
Figure 25:
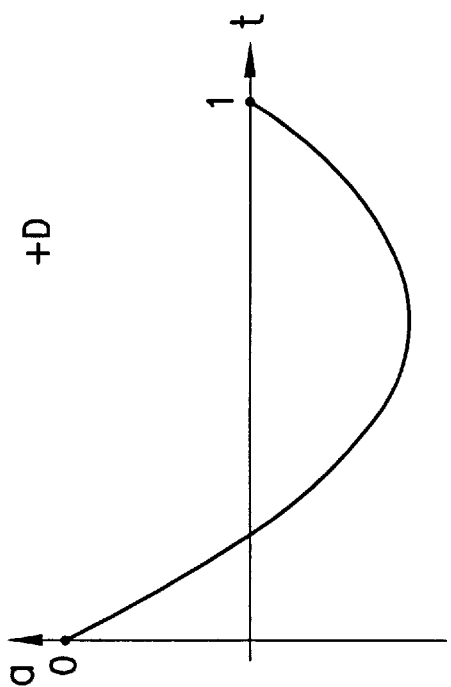
Figure 24:
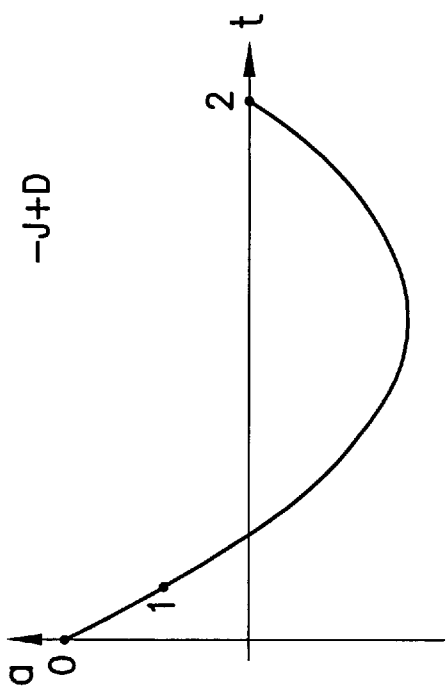

FIG. 11 illustrates the generic trajectory shape for moves along a straight line which is composed of 12 segments as follows:

Segment 0-1: $j = +j_{max}$
Segment 1-2: $d = -d_{max}$
Segment 2-3: $a = +a_{max}$
Segment 3-4: $d = -d_{max}$
Segment 4-5: $j = -j_{max}$
Segment 5-6: $v = v_{max}$ Segment 6-7: $v=v_{max}$
Segment 7-8: $j=-j_{max}$
Segment 8-9: $d=+d_{max}$
Segment 9-10: $a=-a_{max}$
Segment 10-11: $d=+d_{max}$
Segment 11-12: $j=+j_{max}$ The corresponding position, velocity, and acceleration profiles are constructed from the nodal points (i.e., $t_i$, $s_i$, $v_i$, $a_i$, $j_i$, $d_i$) using the following expressions:

$$s=s_i+v_i(t-t_i)+\tfrac{1}{2}a_i(t-t_i)^2+\tfrac{1}{6}j_i(t-t_i)^3+\tfrac{1}{24}d_i(t-t_i)^4 \quad (4.1)$$

$$v=v_i+a_i(t-t_i)+\tfrac{1}{2}j_i(t-t_i)^2+\tfrac{1}{6}d_i(t-t_i)^3 \quad (4.2)$$

$$a=a_i+j_i(t-t_i)+\tfrac{1}{2}d_i(t-t_i)^2 \quad (4.3)$$

$$t \in [t_i, t_{i+1}), i=0, 1, \ldots, 12 \quad (4.4)$$

The complete set of the fundamental trajectory shapes derived from the generic form of FIG. 11 are shown in FIGS. 12–19 which contain shapes derived from the generic shape of FIG. 11 and illustrate fundamental trajectory shapes for movement along a straight line with the numbers indicating so-called trajectory nodes, i.e, the points that divide the trajectories into segments. The corresponding shapes for abort trajectories are summarized in FIGS. 20–25.

Singel-arm Robot Move Along a Circular Arc

Next, a move of a single-arm robot along a circular arc in accordance with the invention is considered, which move is constrained by maximum velocity, acceleration, and jerk imposed on the center point of the end effector. Exemplary time-optimum trajectory shapes are shown in FIGS. 26–32, wherein the segment identifiers refer to the following parameters:

$a_c$=centrifugal acceleration (m/s$^2$)
$a_{max}$=maximum total acceleration (m/s$^2$)
$a_t$=tangential acceleration (m/s$^2$)
$a_{ti}$=tangential acceleration at node i (m/s$^2$)
$a_{total}$=total (tangential+centrifugal) acceleration (m/s$^2$)
$j_{max}$=maximum tangential jerk (m/s$^3$)
$j_t$=tangential jerk (m/s$^3$)
$j_{ti}$=tangential jerk at node i (m/s$^3$)
r=radius of circular arc (m)
s=position (m)
$s_i$=position at node i (m)
$s_{max}$=travel distance (m)
v=velocity (m/s)
$v_i$=velocity at node i (m/s)
$v_{max}$=maximum velocity (m/s)
t=time (s)
$t_i$=time at node i (s)

Figure 26:
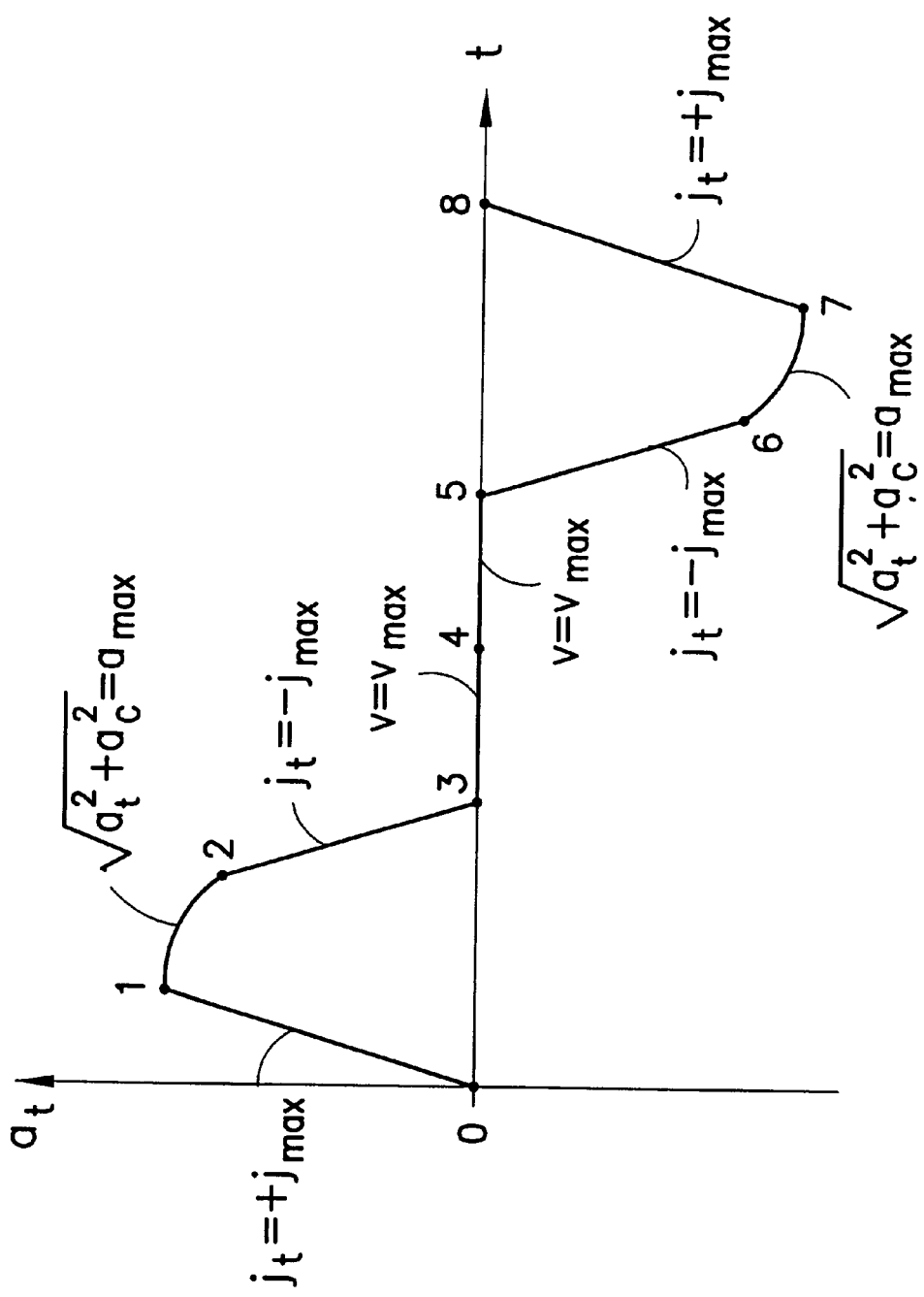
FIG. 26 illustrates the acceleration profile of the generic time-optimum trajectory shape for moves of a single-arm robot and a multi-arm robot, along a circular arc in accordance with the invention.
Figure 28:
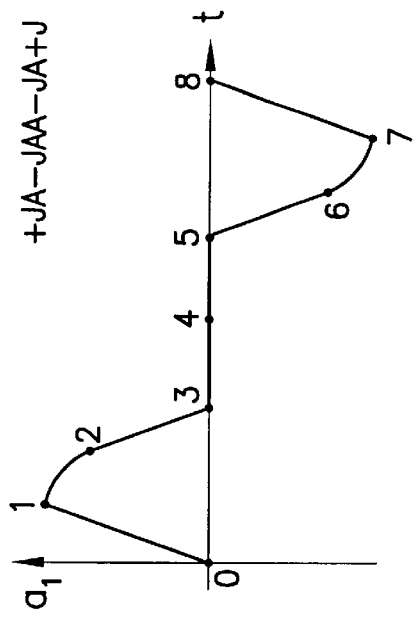
FIGS. 27–32 show a full set of the fundamental trajectory shapes derived from the generic form shown in FIG. 26, and FIGS. 33 and 34 illustrate the corresponding shapes for abort trajectories.
Figure 30:
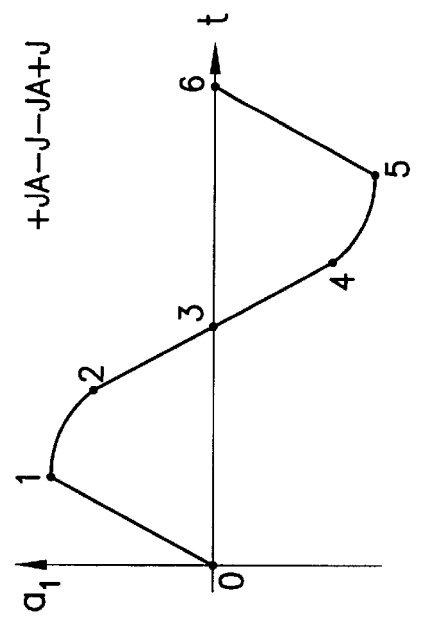
Figure 27:
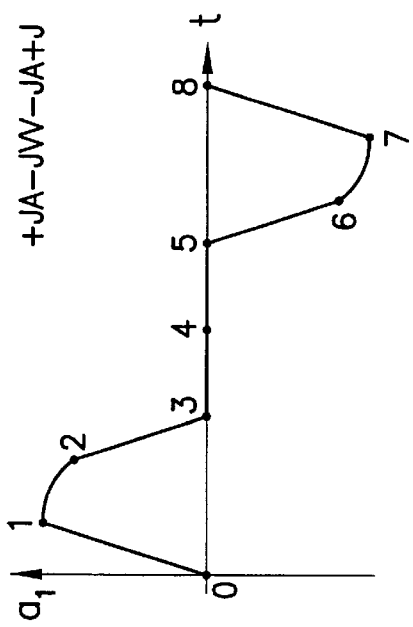
Figure 29:
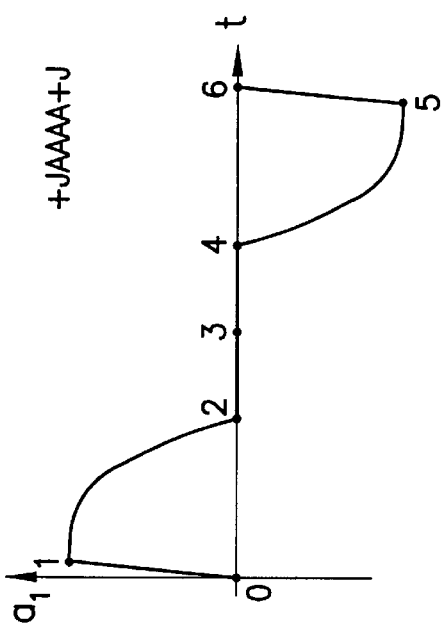
Figure 32:
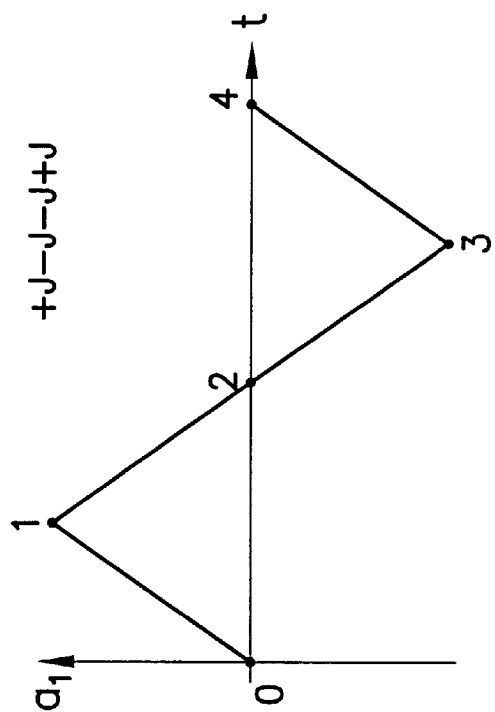
Figure 31:
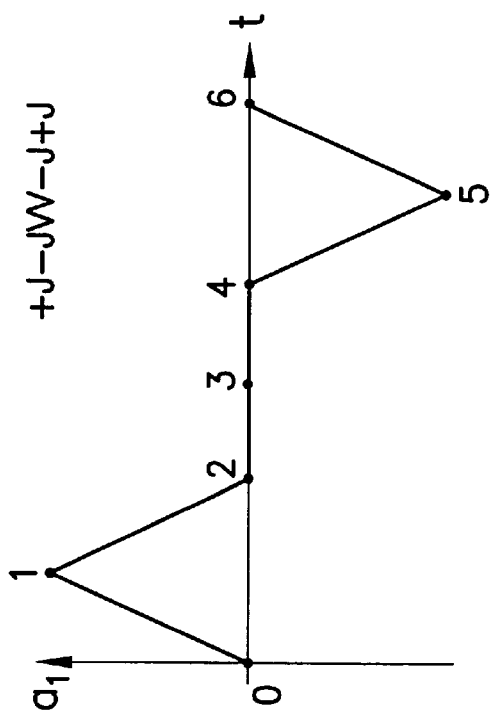

FIG. 26 shows the acceleration profile, acceleration vs. time plot, illustrating the generic trajectory shape for moves along a circular arc. It consists of 8 segments.

Segment 0-1: $j_t=+j_{max}$
Segment 1-2: $a_{total}=a_{max}$
Segment 2-3: $j_t=-j_{max}$
Segment 3-4: $v=v_{max}$
Segment 4-5: $v=v_{max}$
Segment 5-6: $j_t=-j_{max}$
Segment 6-7: $a_{total}=a_{max}$
Segment 7-8: $j_t=+j_{max}$ The total acceleration of the center point of the end effector can be expressed in terms of its tangential and centrifugal components:

$$a_{total}=\sqrt{a_t^2+a_c^2}=\sqrt{(dv/dt)^2+v^4/r^2} \quad (4.5)$$

Therefore, the trajectory in segments 1-2 and 6-7 must satisfy the following condition:

$$a_{max}=\sqrt{(dv/dt)^2+v^4/r^2} \quad (4.6)$$

Eq. (4.6) is a non-linear differential equation which, in general, does not have an analytical solution. It can be shown, however, that the problem can be solved analytically in terms of an auxiliary parameter referred to as $\alpha$ here.

The position, velocity and acceleration profiles are then calculated as:

$$s=s_i+r/2(\alpha-\alpha_i) \quad (4.7)$$

$$v=\sqrt{r\alpha_{max}\sin\alpha} \quad (4.8)$$

$$a_t=a_{max}\cos\alpha \quad (4.9)$$

where $s_i$ and $\alpha_i$ are initial values of s and $\alpha$, respectively. Parameter $\alpha$ is related to time t through the following differential equation:

$$d\alpha/dt=2\sqrt{a_{max}\sin(\alpha)/r} \quad (4.10)$$

Although Eq. (4.10) cannot be solved analytically, its solution can be approximated using a third-degree polynomial in the form of:

$$\alpha=c_0+c_1(t-t_i)+c_2(t-t_i)^2+c_3(t-t_i)^3 \quad (4.11)$$

where coefficients $c_0$ to $c_3$ are determined so that the initial and final conditions in the time interval of interest (segments 1-2 and 6-7) are satisfied exactly, and $t_i$ denotes initial time.

The position, velocity, and acceleration profiles are calculated from the nodal points using the following expressions:

$$s=s_i+v_i(t-t_i)+\tfrac{1}{2}a_{ti}(t-t_i)^2+\tfrac{1}{6}j_{ti}(t-t_i)^3 \quad (4.12)$$

$$v=v_i+a_{ti}(t-t_i)+\tfrac{1}{2}j_{ti}(t-t_i)^2 \quad (4.13)$$

$$a_t=a_{ti}+j_{ti}(t-t_i) \quad (4.14)$$

$$t \in [t_i, t_{i+1}), i=0, 2, 3, 4, 5, 7 \quad (4.15)$$

or, $$\alpha=c_{0i}+c_{1i}(t-t_i)+c_{2i}(t-t_i)^2+c_{3i}(t-t_i)^3 \quad (4.16)$$

$$s=s_i+r/2(\alpha-c_{0i}) \quad (4.17)$$

$$v=\sqrt{r\alpha_{max}\sin\alpha} \quad (4.18)$$

$$a_t=a_{max}\cos\alpha \quad (4.19)$$

$$t \in [t_i, t_{i+1}), i=1, 6 \quad (4.20)$$

Figure 34:
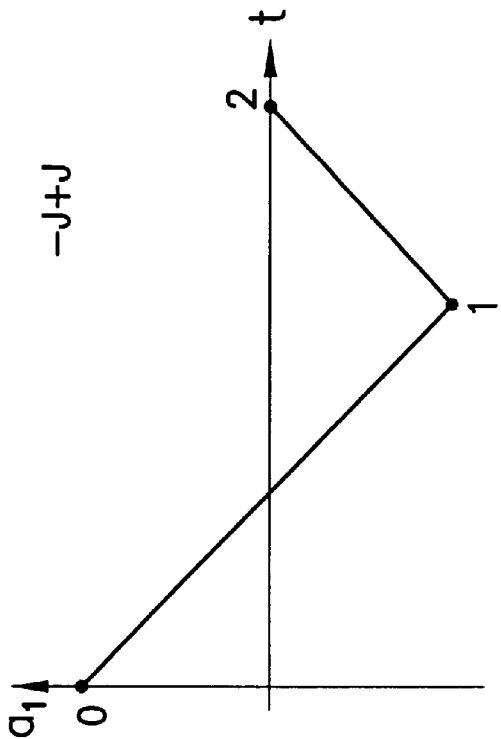
Figure 33:
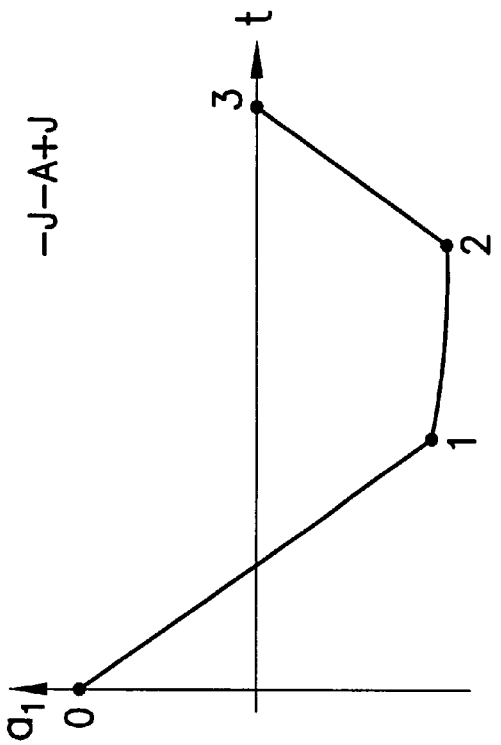

FIGS. 27–32 show a full set of the fundamental trajectory shapes derived from the generic form shown in FIG. 26, and the corresponding shapes for abort trajectories are shown in FIGS. 33 and 34.

Dual-arm Frog-leg Robot Radial Moves

A radial move is a straight-line move in the radial direction with respect to the center of the robot. Exemplary trajectory generation for radial moves of dual-arm frog-leg robots will now be described.

The two end effectors of the robot are denoted as A and B. It is assumed that end effector A is the one performing the radial move. The move is constrained by the maximum allowable acceleration and jerk imposed on end effector A, and the maximum allowable acceleration of end effector B. In general, the two acceleration constraints are not necessarily equal. Time-optimum trajectory shapes are shown in FIGS. 35–47, wherein the segment identifiers refer to the following parameters:

$a_A$=acceleration of arm A (m/s$^2$)
$a_{Ai}$=acceleration of arm A at node i (m/s$^2$)
$a_{Amax}$=maximum acceleration of arm A (m/s$^2$)
$a_B$=acceleration of arm B (m/s$^2$)
$a_{Bi}$=acceleration of arm B at node i (m/s$^2$)
$a_{Bmax}$=maximum acceleration of arm B (m/s$^2$)
$j_A$=jerk of arm A (m/s$^3$)
$j_{Ai}$=jerk of arm A at node i (m/s$^3$)
$j_{Amax}$=maximum jerk of arm A (m/s$^3$)
$j_B$=jerk of arm B (m/s$^3$)
$j_{Bi}$=jerk of arm B at node i (m/s$^3$)
$s_A$=position of arm A (m)
$s_{Ai}$=position of arm A at node i (m)
$s_B$=position of arm B (m)
$s_{Bi}$=position of arm B at node i (m)
t=time (s)
$t_i$=time at node i (s)
$v_A$=velocity of arm A (m/s)
$v_{Ai}$=velocity of arm A at node i (m/s)
$v_B$=velocity of arm B (m/s)
$v_{Bi}$=velocity of arm B at node i (m/s)

Two basic cases can be identified based on the values of the acceleration limits:

Case 1: $a_{Amax} \leq a_{Bmax}$; and
Case 2: $a_{Amax} > a_{Bmax}$.

Since acceleration of end effector B never violates $a_{Amax}$ during radial moves for the known designs of dual-arm frog-leg robots, the acceleration limit $a_{Bmax}$ never becomes active when $a_{Amax} \leq a_{Bmax}$. Consequently, the same trajectory shapes can be used in Case 1 as for a straight-line move of a single-arm robot as described above.

Figure 35:
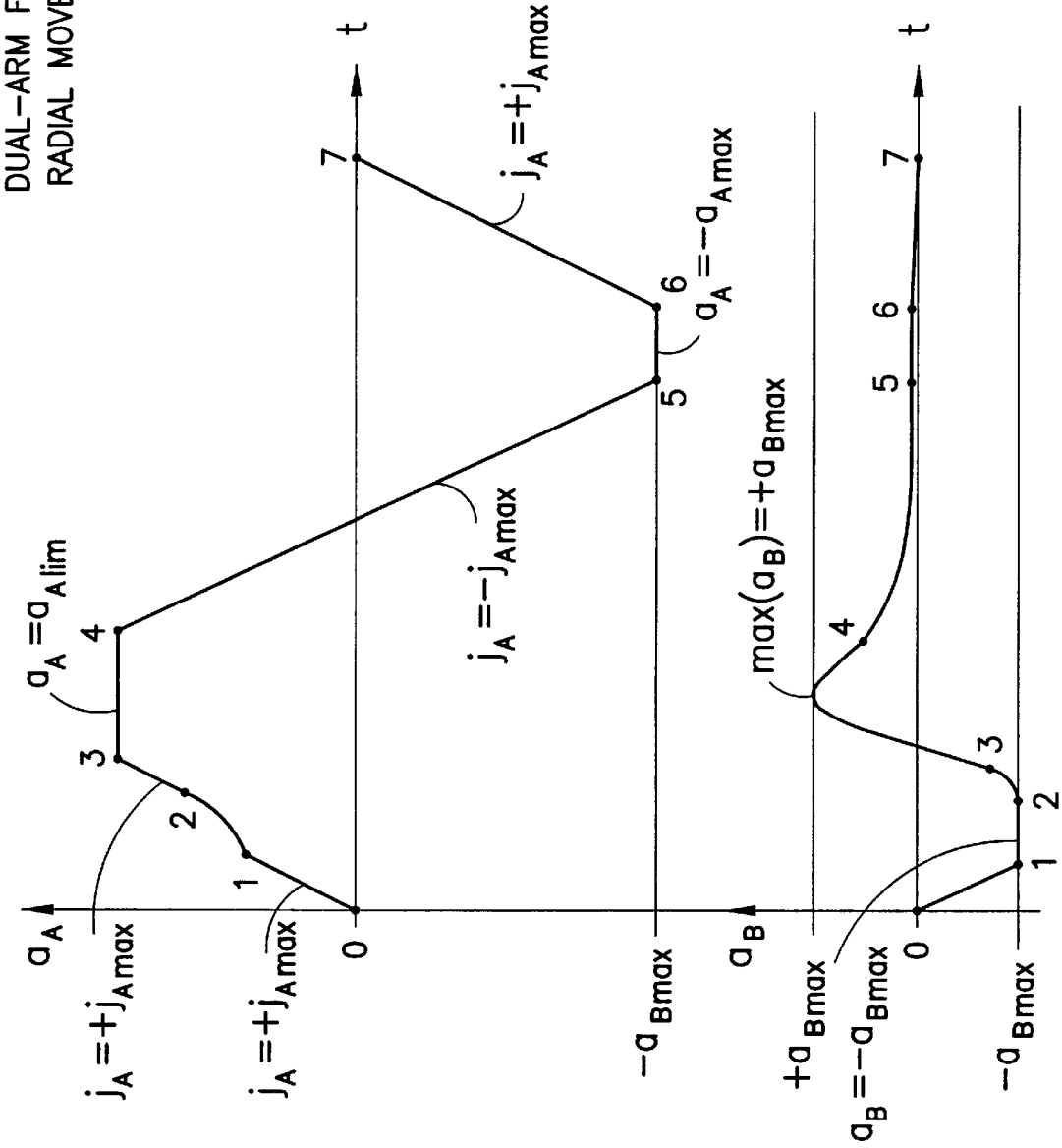
FIGS. 35–49 illustrate shapes of exemplary time-optimum trajectories for radial moves of a dual-arm frog-leg robot with unequally constrained arms in accordance with the invention. More particularly.
Figure 37:
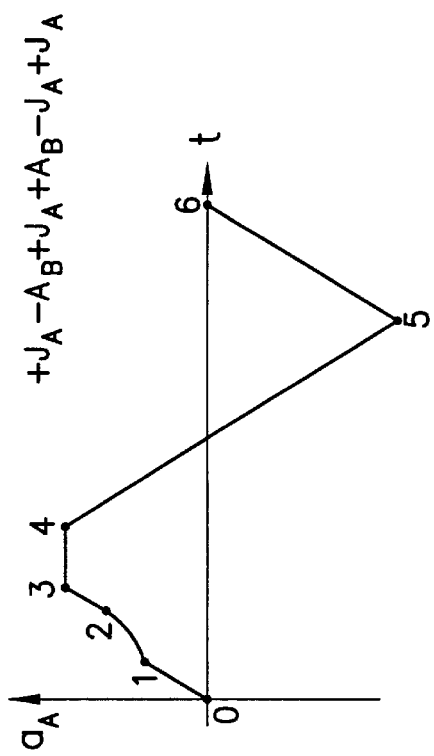
Figure 39:
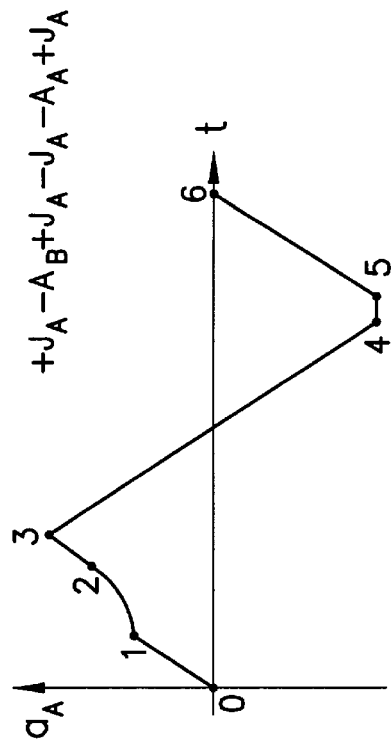
Figure 36:
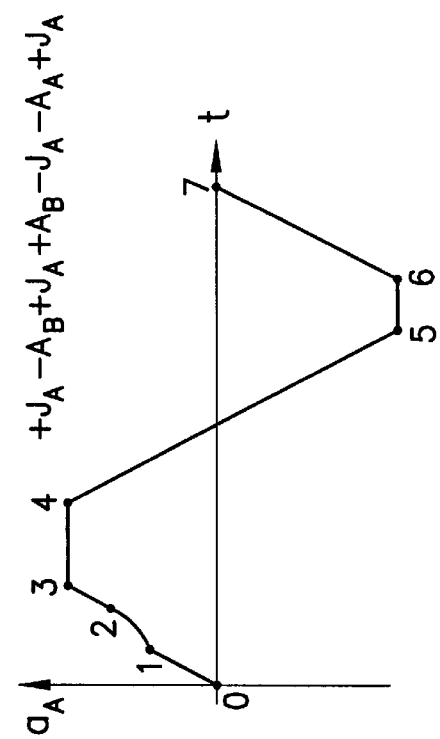
Figure 38:
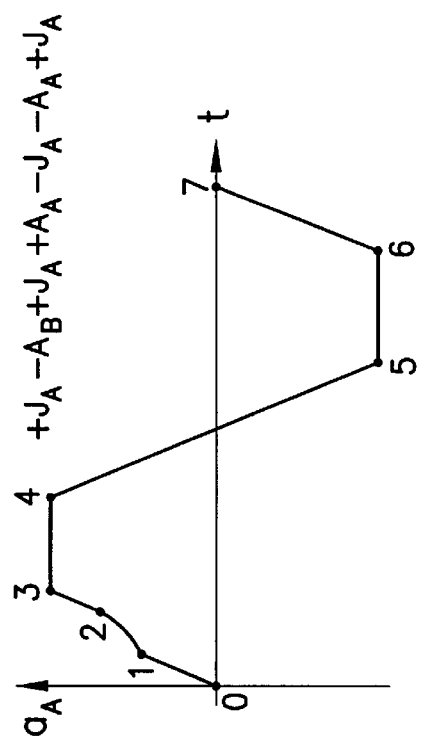
Figure 41:
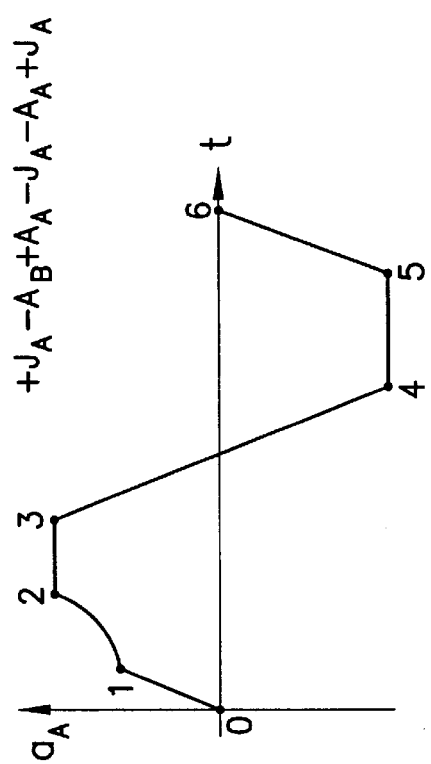
Figure 43:
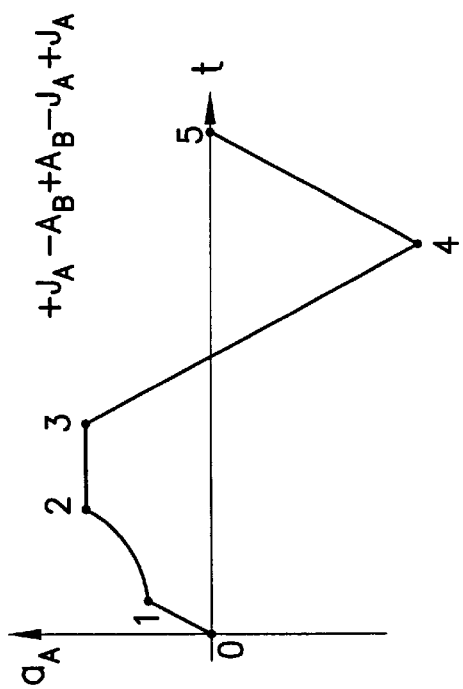
Figure 40:
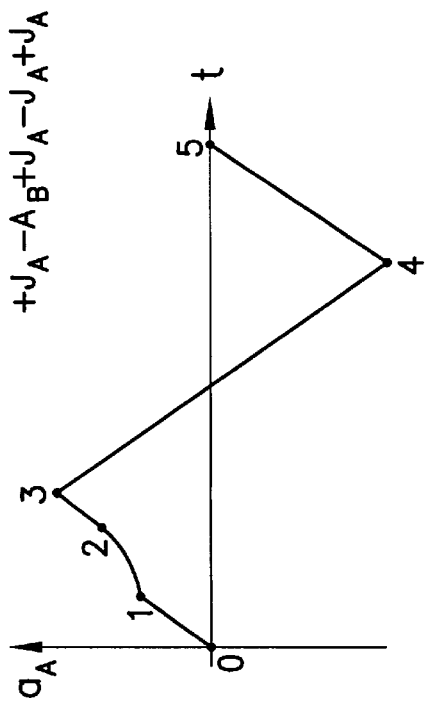
Figure 42:
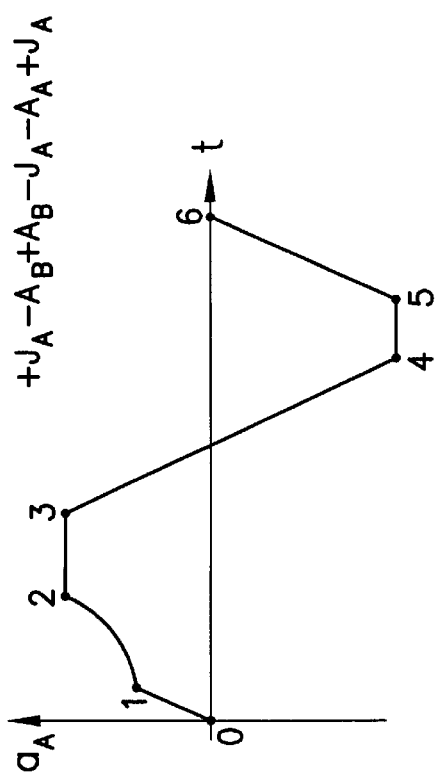
Figure 44:
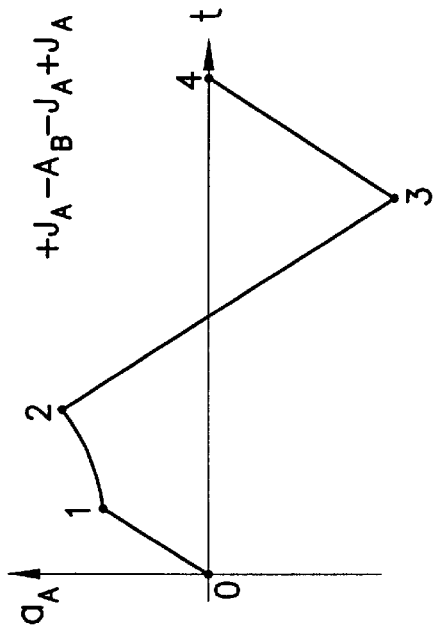
Figure 45:
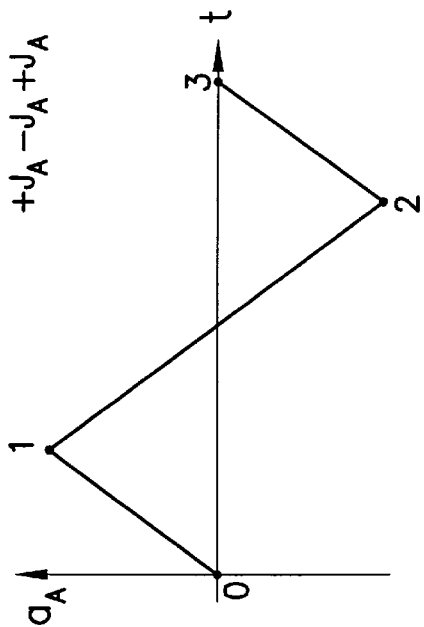
Figure 46:
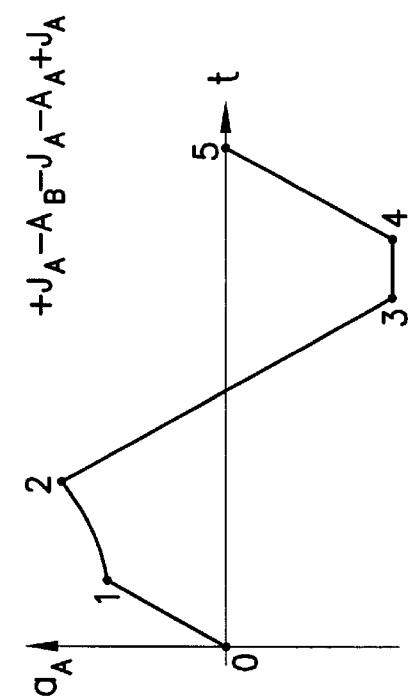
Figure 47:
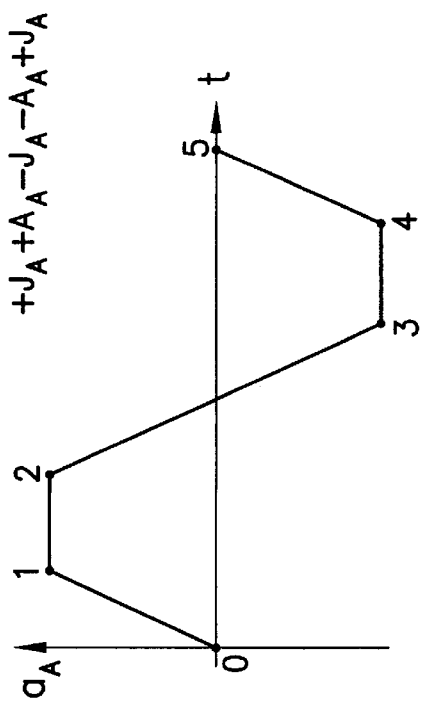

The generic trajectory shape for Case 2 is depicted in FIG. 35. It is composed of 7 segments:

Segment 0-1: $j_A = +j_{Amax}$
Segment 1-2: $a_B = -a_{Bmax}$
Segment 2-3: $j_A = +j_{Amax}$
Segment 3-4: $a_A = a_{Alim}$
Segment 4-5: $j_A = -j_{Amax}$
Segment 5-6: $a_A = -a_{Amax}$
Segment 6-7: $j_A = +j_{Amax}$ At the cost of a slight deviation from the optimum solution, the value of $a_{Alim}$ is selected so that max($a_B$)=+$a_{Bmax}$. Due to this simplification the number of necessary fundamental trajectory shapes is reduced substantially. The position, velocity, and acceleration profiles are calculated from the nodal points according to the following expressions:

$$s_i = s_{ij} + v_{ij}(t-t_j)^2 + \tfrac{1}{2}a_{ij}(t-t_j)^2 + \tfrac{1}{6}j_{ij}(t-t_j)^3 \quad (4.21)$$

$$v_i = v_{ij} + a_{ij}(t-t_j) + \tfrac{1}{2}j_{ij}(t-t_j)^2 \quad (4.22)$$

$$a_i = a_{ij} + j_{ij}(t-t_j) \quad (4.23)$$

$$t \in [t_j, t_{j+1}), j=0, 1, \ldots, 4 \quad (4.24)$$

$$i=A \text{ for } j=0, 2, 3, 4 \quad (4.25)$$

$$i=B \text{ for } j=1 \quad (4.26)$$

Figure 48:
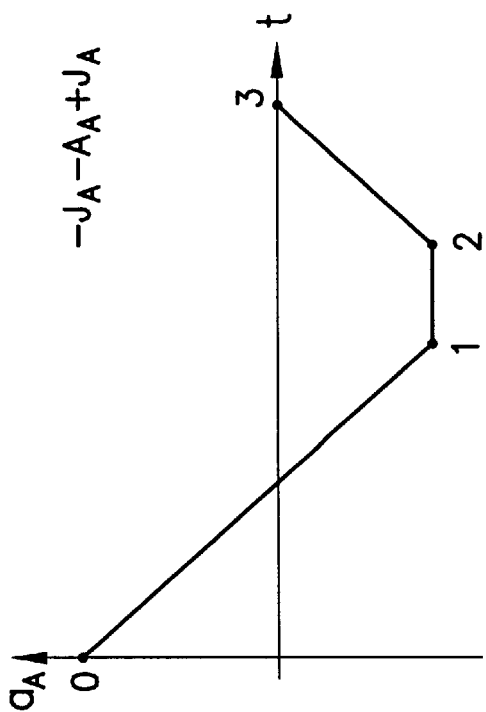

The complete set of the fundamental trajectory shapes derived from the generic form of FIG. 35 is given in FIGS. 36–47. The corresponding shapes for abort trajectories are depicted in FIGS. 48 and 49.

Dual-arm Robot Rotational Move

The last category of simple moves to be described are the rotational moves of dual-arm robots, i.e., robotic manipulators equipped with two end effectors. A rotational move is performed when the end effectors of the robot move along circular arcs with a common center.

Again, the two end effectors of the robot are denoted as A and B. It is assumed that end effector A is the one commanded to perform the rotational move. The move is constrained by the maximum allowable acceleration and jerk imposed on end effector A, and the maximum allowable acceleration of end effector B. In general, the two acceleration constraints do not have to be equal.

It can be shown that the acceleration limit imposed on end effector B is never violated if the following condition is satisfied:

$$a_{Amax}/r_A \leq a_{Bmax}/r_B \quad (4.27)$$

where:

$a_{Amax}$=maximum acceleration of arm A (m/s$^2$)
$a_{Bmax}$=maximum acceleration of arm B (m/s$^2$)
$r_A$=radius of rotation for arm A (m)
$r_B$=radius of rotation for arm B (m)

Consequently, the same fundamental trajectory shapes can be used as for single-arm robots as described above with respect to FIGS. 26–34. If the condition of Eq. (4.27) is not satisfied, the trajectory should be generated based on the radius and the acceleration limit associated with end effector B.

Trajectories For Compound or Blended Moves

In many applications, a simple path such as a straight line or a circular arc is not sufficient alone, such as when faced with workspace limitations, so that the desired path must be achieved as a sequence of several moves and the overall travel time is increased. The time losses are due to stops between individual moves executed sequentially.

These stops can be eliminated by a blending technique in accordance with the present invention which will now be described.

A system for blending simple moves into a single trajectory in accordance with the invention is as follows. The essential approach is to decompose trajectories of the individual moves into their orthogonal or independent components, and overlap them for a given time interval. The decomposition into the orthogonal components is obtained e.g., by x- and y-decomposition in the cartesian coordinate system. This results in a non-stop move along a smooth path. Two examples are presented for illustration, i.e., the blending of two straight-line moves and the blending of a straight-line move into a circular-arc path, which moves are as shown respectively in FIG. 50 side (a) and side (b). FIG. 50 schematically depicts, on the left side (a), the path for an exemplary sequential move consisting of two straight-line segments, from point 0 to 1 and from point 1 to 2, and on the right side (b), an exemplary sequential move along a straight line and along a circular arc, from point 0 to 1 and 1 to 2, respectively.

Blending of Two Straight-line Moves

The first sequential move under consideration is schematically depicted in FIG. 50 side (a). It consists of two straight-line segments, from point 0 to 1, and from point 1 to 2, on a path. Provided that the trajectories for the two segments are available, e.g., generated based on the pre-defined time-optimum trajectory shapes described above, the position, velocity, and acceleration profiles for this blended move are obtained using the following equations:

$$s_x(t) = x_0 + s_A(t)\cos\alpha_A + s_B(t-t_A+\Delta)\cos\alpha_B \quad (5.1)$$

$$s_y(t) = y_0 + s_A(t)\sin\alpha_A + s_B(t-t_A+\Delta)\sin\alpha_B \quad (5.2)$$

$$v_x(t) = v_A(t)\cos\alpha_A + v_B(t-t_A+\Delta)\cos\alpha_B \quad (5.3)$$

$$v_y(t) = v_A(t)\sin\alpha_A + v_B(t-t_A+\Delta)\sin\alpha_B \quad (5.4)$$

$$a_x(t) = a_A(t)\cos\alpha_A + a_B(t-t_A+\Delta)\cos\alpha_B \quad (5.5)$$

$$a_y(t) = a_A(t)\sin\alpha_A + a_B(t-t_A+\Delta)\sin\alpha_B \quad (5.6)$$

where:
- $x_0, y_0$ = x-, y-coordinates of point 0 (m)
- $x_1, y_1$ = x-, y-coordinates of point 1 (m)
- $s_A, v_A, a_A$ = position, velocity, and acceleration profiles for segment 0-1 (m)
- $s_B, v_B, a_B$ = position, velocity, and acceleration profiles for segment 1-2 (m)
- $t_A$ = duration of the move along segment 0-1 (s)
- $\Delta$ = overlap time (s)

A typical example of blending two straight-line moves is illustrated in FIG. 51, which shows round substrates following two straight-line segments, from point 0 to 1 and from point 1 to 2, on the left side (a) for the sequential case, and, on the right side (b) for a compound move.

Blending of a Straight Line and a Circular Arc

The second sequential move under consideration is schematically depicted in FIG. 50 side (b). It consists of a sequence of first a move along a straight line, from point 0 to 1, and then a move along a circular arc from point 1 to 2. Provided again that the trajectories for the two segments are available, e.g., generated based on the pre-defined time-optimum trajectory shapes as described above, the position, velocity, and acceleration profiles for the blended move are calculated using the following equations:

$$s_x(t) = x_0 + s_A(t)\cos\alpha_A + x_C + r\sin[\beta + s_B(\tau)/r] - x_1 \quad (5.7)$$

$$s_y(t) = y_0 + s_A(t)\sin\alpha_A + y_c + r\cos[\beta + s_B(\tau)/r] - y_1 \quad (5.8)$$

$$v_x(t) = v_A(t)\cos\alpha_A + v_B(\tau)\cos[\beta + s_B(\tau)/r] \quad (5.9)$$

$$v_y(t) = v_A(t)\sin\alpha_A + v_B(\tau)\sin[\alpha + s_B(\tau)/r] \quad (5.10)$$

$$a_x(t) = a_A(t)\cos\alpha_A + a_B(\tau)\cos[\beta + s_B(\tau)/r] - [v_B^2(\tau)/r]\sin[\beta + s_B(\tau)/r] \quad (5.11)$$

$$a_y(t) = a_A(t)\sin\alpha_A + a_B(\tau)\sin[+\beta s_B(\tau)/r] + [v_B^{2A}(\tau)/r]\cos[\beta + s_B(\tau)/r] \quad (5.12)$$

where:

$$r = \sqrt{(x_1 - x_c)^2 + (y_1 - y_c)^2} \quad (5.13)$$

$$\beta = \tan^{-1}[(x_1 - x_c)/(y_c - y_1)] \quad (5.14)$$

$$\tau = t - t_A + \Delta \quad (5.15)$$

and
- $x_0, y_0$ = x-, y-coordinates of point 0 (m)
- $X_1, y_1$ = x-, y-coordinates of point 1 (m)
- $x_c, y_c$ = x-, y-coordinates of the center of the circular arc (m)
- $s_A, v_A, a_A$ = position (m), velocity (m/s), and acceleration (m/s$^2$) profiles for segment 0-14
- $s_B, v_B, a_B$ = position (m), velocity (m/s), and acceleration (m/s$^2$) profiles for segment 1-2
- $t_A$ = duration of the move along segment 0-1 (s)
- $\Delta$ = overlap time (s)

An exemplary diagram of the blending of two moves along a straight line, i.e., segments from point 0 to 1 and from point 2 to 3, and a move along a circular arc, the segment from point 1 to 2, is illustrated in FIG. 52, which shows round substrates following the respective segments, on the left side (a) for the sequential case, and, on the right side (b) for a compound move. The left side (a) case represents the path according to the prior art while the right side (b) represents an optimum transfer path for round substrates undergoing composite moves in accordance with the invention.

A further comparison of the invention with the existing approach (e.g., U.S. Pat. No. 5,655,060) is shown in FIGS. 53–58 for a representative set of moves. The plots confirm that the approach of the invention based on predefined time-optimum trajectory shapes provides defect-free and easy-to-track profiles. In addition, in the existing approach, an angular jerk constraint is imposed on the arm driving motors, so that the maximum jerk at the center of the end effector is not constant and its variation depends on the kinematics of the arm. In contrast, with the invention the jerk constraint is imposed directly on the center of the end effector. This change leads to improved travel times as will be seen in FIGS. 53–56.

It will therefore be appreciated from the foregoing description that the present invention offers many advantages over the systems of the prior art, such as, its reliability for any combination of arm dimensions, speed, and departure/destination positions, and the elimination of all types of defects since it results in ideal acceleration profiles. Further, the resulting trajectories are time-optimal, or sub-optimal for certain radial moves of dual-arm frog-leg robots, and achieves shorter travel times due to the constant jerk limit imposed on the center of the end effector for straight-line moves. It offers easy-to-track trajectories for straight-line moves with smooth acceleration profiles, and is computationally efficient, typically being more than 100× faster than the existing iterative approach. Due to the faster computation capability, shorter abort times and abort travel distances are guaranteed. The invention is less memory demanding with a maximum of 12 trajectory nodes stored (for the categories of moves considered), and it eliminates different settings of the trajectory generator for different arms and speeds. It is applicable to all of the arms of the transfer apparatus, including two-link and frog-leg designs and particularly "BiSymmetric" and "Leapfrog" arm designs, and supports compound moves with a blended transfer path.

What is claimed is:

1. A method for reliable and numerically efficient generation of constrained time-optimum trajectories with easyto-track or continuous acceleration profiles for the arm movements of robotic manipulators to produce time-optimum arm movement along a transfer path, comprising the steps of:

identifying a set of fundamental trajectory shapes which cover a given set of constraints for a given category of arm movements along a transfer path;

determining the set of conditions associated with each fundamental trajectory shape which determine whether the shape can be used for a particular arm movement;

decomposing said fundamental trajectory shapes into segments where a single constraint is active;

determining the time-optimum trajectory solutions for the segments;

combining the time-optimum trajectory solutions of the segments into time-optimum trajectory shapes; and producing a time-optimum arm movement along the transfer path by selecting the time-optimum trajectory shape that can be used for the arm movement based on the determinations from determining the set of conditions.

2. The method as in claim 1 wherein the arm movements are of a single-arm robot, the transfer path is a straight line, and the set of constraints comprises maximum velocity, acceleration, jerk and jerk rate in the vicinity of the acceleration limit.

3. The method as in claim 1 wherein the arm movements are of a single-arm robot, the transfer path is a circular arc, and the set of constraints comprises maximum velocity, total acceleration, and tangential jerk.

4. The method as in claim 1 wherein the arm movements are of a dual-arm robot comprising an end effector A and an end effector B, the transfer path comprises radial moves, and the set of constraints comprises maximum velocity, acceleration, jerk and jerk rate in the vicinity of the acceleration limit on end effector A, and maximum acceleration on end effector B.

5. The method as in claim 1 wherein the arm movements are of a dual-arm robot comprising an end effector A and an end effector B, the transfer path comprises radial moves, and the set of constraints comprises maximum jerk and acceleration on end effector A, and maximum acceleration on end effector B.

6. The method as in claim 1 wherein the arm movements are of a dual-arm robot, the transfer path comprises a rotational move, and the set of constraints comprises maximum velocity, total acceleration, and tangential jerk.

7. The method as in claim 1 wherein said transfer path comprises a straight-line and an arc.

8. The method as in claim 1 wherein said robotic manipulators are provided with end effectors and the trajectories are constrained by velocity, acceleration, jerk and jerk rate limits that are imposed on the centers of the end effectors of the robotic manipulator.

9. The method as in claim 1 wherein said robotic manipulators are provided with end effectors and the step of identifying the set of fundamental trajectory shapes comprises:

minimizing the time required for the robotic manipulator to travel a set distance to a final point from a start point along a transfer path; and avoiding a command of an acceleration that would exceed a holding force between an end effector and a substrate supported thereon.

10. An apparatus for reliable and numerically efficient generation of time-optimum trajectories with easy-to-track or continuous acceleration profiles for the arm moves of robotic manipulators to produce time-optimum arm movement along a transfer path, comprising:

means for pre-defining a set of fundamental trajectory shapes which cover all possible combinations of constraints for a given category of arm movements along a trajectory path;

means for determining the set of conditions associated with each fundamental trajectory shape which determine whether the shape can be used for a particular arm movement;

means for decomposing said fundamental trajectory shapes into segments where a single constraint is active;

means for determining the time-optimum solutions for the segments;

means for combining the time-optimum solutions of the segments into time-optimum trajectory shapes; and means for producing time-optimum arm moves of the robotic manipulators along the transfer path by selecting time-optimum trajectory shapes that can be used for the particular arm moves based on the determinations of said means for determining the set of conditions.

11. Apparatus as in claim 10 wherein the robotic manipulators comprise a single-arm robot, the transfer path is a straight line, and the set of constraints comprises maximum velocity, acceleration, jerk and jerk rate in the vicinity of the acceleration limit.

12. Apparatus as in claim 10 wherein the robotic manipulators comprise a single-arm robot, the transfer path is a circular arc, and the set of constraints comprises maximum velocity, total acceleration, and tangential jerk.

13. Apparatus as in claim 10 wherein the robotic manipulators comprise a dual-arm robot comprising an end effector A and an end effector B, the transfer path comprises radial moves, and the set of constraints comprises maximum velocity, acceleration, jerk and jerk rate in the vicinity of the acceleration limit on end effector A, and maximum acceleration on end effector B.

14. Apparatus as in claim 10 wherein the robotic manipulators comprise a dual-arm robot comprising an end effector A and an end effector B, the transfer path comprises radial moves, and the set of constraints comprises maximum jerk and acceleration on end effector A, and maximum acceleration on end effector B.

15. Apparatus as in claim 10 wherein the robotic manipulators comprise a dual-arm robot, the transfer path comprises a rotational move, and the set of constraints comprises maximum velocity, total acceleration, and tangential jerk.

16. Apparatus as in claim 10 wherein said transfer path comprises a straight-line and an arc.

17. Apparatus as in claim 10 wherein said robotic manipulators comprise end effectors and the trajectories are constrained by velocity, acceleration, jerk and jerk rate limits that are imposed on the centers of the end effectors.

18. Apparatus as in claim 10 wherein said robotic manipulators comprise end effectors and the means for pre-defining the set of fundamental trajectory shapes comprises:

means for minimizing the time required for the robotic manipulator to travel a set distance to a final point from a start point along a transfer path; and means for avoiding a command of an acceleration that would exceed a holding force between an end effector and a substrate supported thereon.

19. A method for reliable and numerically efficient blending of trajectories for simple moves of multi-arm robotic manipulators into a non-stop compound move along a smooth path, comprising the steps of:
- decomposing trajectories for the individual simple moves into independent components;
- overlapping said independent components of the trajectories for the individual simple moves for a given time interval; and
- combining the overlapped components into a trajectory that provides a non-stop move along a smooth path;
- identifying a set of fundamental trajectory shapes which cover a given set of constraints for a given category of arm movement along a transfer path.

20. The method as in claim 19 wherein the independent components of the trajectories for the individual simple moves are orthogonal and obtained by x- and y-decomposition in the cartesian coordinate system.

21. The method as in claim 19, wherein the individual simple moves of the robotic manipulator comprise straight lines and circular arcs.

22. An apparatus for reliable and numerically efficient blending of trajectories for simple moves of multi-arm robotic manipulators into a non-stop compound move along a smooth path, comprising:
- means for decomposing trajectories for the individual simple moves into independent components;
- means for overlapping said independent components of the trajectories for the individual simple moves for a given time interval; and
- means for combining the overlapped components into a trajectory that provides a non-stop move along a smooth path;
- identifying a set of fundamental trajectory shapes which cover a given set of constraints for a given category of arm movement along a transfer path.

23. The apparatus as in claim 22 wherein the independent components of the trajectories for the individual simple moves are obtained by x- and y-decomposition in the cartesian coordinate system.

24. The apparatus as in claim 22 wherein the individual simple moves of the robotic manipulator comprise straight lines and circular arcs.

* * * * *